(12) United States Patent  
Jagannathan

(10) Patent No.: US 7,979,453 B2  
(45) Date of Patent: Jul. 12, 2011

(54) EFFICIENT SEARCH RESULT UPDATE MECHANISM

(75) Inventor: Govindarajan Jagannathan, Oakton, VA (US)

(73) Assignee: Innovative Solutions, Inc., Oakton, VA (US)

(*) Notice: Subject to any disclaimer, the term of this patent is extended or adjusted under 35 U.S.C. 154(b) by 0 days.

(21) Appl. No.: 11/844,229

(22) Filed: Aug. 23, 2007

(65) Prior Publication Data

US 2008/0071769 A1   Mar. 20, 2008

Related U.S. Application Data

(60) Provisional application No. 60/823,370, filed on Aug. 23, 2006.

(51) Int. Cl.
  *G06F 17/30* (2006.01)
  *G06F 7/00* (2006.01)
(52) U.S. Cl. .......... 707/758; 707/741; 707/767
(58) Field of Classification Search ....... 707/5, E17.081, 707/E17.063, 999.5, 741, 758, 767
See application file for complete search history.

(56) References Cited

U.S. PATENT DOCUMENTS

| | | | | |
|---|---|---|---|---|
| 5,157,783 A | * | 10/1992 | Anderson et al. | 707/4 |
| 5,428,776 A | * | 6/1995 | Rothfield | 707/4 |
| 5,548,770 A | * | 8/1996 | Bridges | 707/2 |
| 5,560,007 A | * | 9/1996 | Thai | 707/3 |
| 5,581,756 A | * | 12/1996 | Nakabayashi | 707/2 |
| 5,664,173 A | * | 9/1997 | Fast | 707/4 |
| 5,727,196 A | * | 3/1998 | Strauss et al. | 707/2 |
| 5,745,882 A | * | 4/1998 | Bixler et al. | 705/26 |
| 5,864,863 A | * | 1/1999 | Burrows | 707/103 R |
| 5,870,747 A | * | 2/1999 | Sundaresan | 707/101 |
| 5,893,125 A | * | 4/1999 | Shostak | 715/206 |
| 5,999,943 A | * | 12/1999 | Nori et al. | 707/104.1 |
| 6,047,285 A | * | 4/2000 | Jacobs et al. | 707/4 |
| 6,061,678 A | * | 5/2000 | Klein et al. | 707/3 |

(Continued)

OTHER PUBLICATIONS

Kline, Kevin E., et al., SQL in a Nutshell, 2nd Edition, O'Reilly Media, Inc., Sebastopol, CA, Sep. 2004, pp. vii-viii and 580-581.*

(Continued)

*Primary Examiner* — Robert Stevens
(74) *Attorney, Agent, or Firm* — Mark J. Danielson; Pillsbury Winthrop Shaw Pittman LLP

(57) ABSTRACT

A method/algorithm allows database queries to be saved and an efficient mechanism that matches records whenever they are added or modified to all of the saved queries and returns the list of those queries that match a given record as soon as the record is added or modified. If used in an online search portal example (e.g. a job search site), this invention would allow the searcher to submit and save his search criteria once and the application would return the listings that match the search criteria at that point in time and will also automatically match any new listings that get added after the query gets saved and if a match occurs would notify the user of the listing as soon as the listing is added. This matching on new listings to the saved search will happen continuously until the search is removed. According to an aspect of the invention, by matching a record that is added or changed to the database to all saved queries, it provides convenience to the users and it also reduces the computational cost to achieve the same result relative to other existing techniques to address the same scenario.

20 Claims, 9 Drawing Sheets

U.S. PATENT DOCUMENTS

| | | | |
|---|---|---|---|
| 6,105,025 A * | 8/2000 | Jacobs et al. | 707/8 |
| 6,266,663 B1 * | 7/2001 | Fuh et al. | 707/4 |
| 6,353,821 B1 * | 3/2002 | Gray | 707/715 |
| 6,366,904 B1 * | 4/2002 | BenHadda et al. | 707/3 |
| 6,421,662 B1 * | 7/2002 | Karten | 707/3 |
| 6,643,636 B1 * | 11/2003 | Au et al. | 707/2 |
| 6,915,291 B2 * | 7/2005 | Carlson et al. | 1/1 |
| 7,127,467 B2 * | 10/2006 | Yalamanchi et al. | 707/102 |
| 7,370,035 B2 * | 5/2008 | Gross et al. | 707/3 |
| 7,406,477 B2 * | 7/2008 | Farrar et al. | 707/102 |
| 7,457,797 B2 * | 11/2008 | Bestgen et al. | 1/1 |
| 7,499,917 B2 * | 3/2009 | Purcell et al. | 1/1 |
| 7,644,066 B2 * | 1/2010 | Krishnaprasad et al. | 1/1 |
| 7,849,063 B2 * | 12/2010 | Stata et al. | 707/696 |
| 2003/0195873 A1 * | 10/2003 | Lewak et al. | 707/3 |
| 2003/0212670 A1 * | 11/2003 | Yalamanchi et al. | 707/3 |
| 2003/0229627 A1 * | 12/2003 | Carlson et al. | 707/3 |
| 2003/0229639 A1 * | 12/2003 | Carlson et al. | 707/100 |
| 2004/0003004 A1 * | 1/2004 | Chaudhuri et al. | 707/200 |
| 2004/0133564 A1 * | 7/2004 | Gross et al. | 707/3 |
| 2004/0143564 A1 * | 7/2004 | Gross et al. | 707/1 |
| 2005/0055381 A1 * | 3/2005 | Ganesh et al. | 707/200 |
| 2005/0055384 A1 * | 3/2005 | Ganesh et al. | 707/202 |
| 2005/0114370 A1 * | 5/2005 | Lewak et al. | 707/100 |
| 2006/0074874 A1 * | 4/2006 | Day et al. | 707/3 |
| 2006/0074875 A1 * | 4/2006 | Faunce et al. | 707/3 |
| 2007/0050333 A1 * | 3/2007 | Vogler | 707/3 |
| 2007/0219980 A1 * | 9/2007 | Songfack | 707/5 |
| 2007/0239681 A1 * | 10/2007 | Krishnaprasad et al. | 707/3 |
| 2007/0250517 A1 * | 10/2007 | Bestgen et al. | 707/100 |

OTHER PUBLICATIONS

Microsoft Computer Dictionary, 5th Edition, Microsoft Press, Redmond, WA, © 2002, pp. 141, 255, 260, 413 and 564.*

Liu, Ling, et al., "CONQUER: A Continual Query System for Update Monitoring in the WWW", International Journal of Computer Systems, Science and Engineering, © 1999, pp. i and 1-25.*

Yalamanchi, Aravind, et al., "Managing Expressions as Data in Relational Database Systems", CIDR 2003, Asilomar, CA, Jan. 5-8, 2003, pp. 1-11.*

Watanabe, Yousuke, et al., "A multiple Continuous Query Optimization Method Based on Query Execution Pattern Analysis", DASFAA 2004, LNCS 2973, Springer-Verlag, Berlin, Germany, Feb. 12, 2004, pp. 443-456.*

Luo, Qiong, et al., "Active Query caching for Database web Servers", WebDB 2000, LNCS 1997, Springer-Verlag, Berlin, Germany, © 2001, pp. 92-104.*

Shin, Hyoseop, et al., "A Lightweight XML Repository Supporting Dynamic Partial Update of XML Data", DASFAA 2004, LNCS 2973, Springer-Verlag, Berlin, Germany, Feb. 12, 2004, pp. 220-225.*

Botev, Chavdar, et al., "A TeXQuery-Based XML Full-Text search Engine", SIGMOD 2004, Paris, France, Jun. 13-18, 2004, 2 pages.*

Kinutani, Hiroko, et al., "Identifying Result Subdocuments of XML Search Conditions", DLRP 2000, Kyoto, Japan, Nov. 13-16, 2000, pp. 254-261.*

O'Neil, Patrick, et al., "Improved Query Performance with Variant Indexes", SIGMOD '97, Arizona, © 1997, pp. 38-49.*

Jang, Hyunchul, et al., "An Effective Mechanism for Index Update in Structured Documents", CIKM '99, Kansas City, MO, © 1999, pp. 383-390.*

Gawlick, Dieter, et al., "Applications for Expression Data in Relational Database Systems", ICDE 2004, IEEE Computer Society, Mar. 30-Apr. 2, 2004, pp. 609-620.*

Theobald, Martin, et al., "Top-k Query Evaluation with Probabilistic Guarantees", Proc. of the 30th VLDB Conf., Toronto, Canada, 2004, pp. 648-659.*

Grabs, Torsten, et al., "Scalable Distributed Query and Update Service Implementations for XML Document Elements", RIDE 2001, Heidelberg, Germany, Apr. 1-2, 2001, pp. 35-42.*

Hanson, Eric N., et al., "The Design and Implementation of the Ariel Active Database Rule System", IEEE Transactions on Knowledge and Data Engineering, vol. 8, No. 1, Feb. 1996, pp. 157-172.*

Jin, Chun, et al., "Incremental Aggregation on Multiple Continuous Queries", ISMIS 2006, LNAI 4203, Springer-Verlag, Berlin, Germany, © 2006, pp. 167-177.*

Jang, Hyunchul, et al., "An Effective Mechanism for Index Update in Structured Documents", CIKM '99, Kansas City, MO, Nov. 1999, pp. 383-390.*

Dohnal, Vlastislav, et al., "D-Index: Distance Searching Index for Metric Data Sets", Multimedia Tools and Applications, vol. 21, No. 1, Kluwer Academic Publishers, © 2003, pp. 9-33.*

* cited by examiner

| Node = J |  |  |
|---|---|---|
| Address = 1 |  |  |
| Parent Node Address = NULL |  |  |
| Number of children = 0 |  |  |
| Term End Point = N |  |  |
| Child Node Addresses |  |  |
| Num | Node Path | Address |
|  |  |  |

| Node = J |  |  |
|---|---|---|
| Address = 1 |  |  |
| Parent Node Address = NULL |  |  |
| Number of children = 1 |  |  |
| Term End Point = N |  |  |
| Child Node Addresses |  |  |
| Num | Node Path | Address |
| 1 | O | 11 |

402

O

| Node = JOHN |  |  |
|---|---|---|
| Address = 11 |  |  |
| Parent Node Address = 1 |  |  |
| Number of children = 0 |  |  |
| Term End Point = Y |  |  |
| Child Node Addresses |  |  |
| Num | Node Path | Address |
|  |  |  |

EFFICIENT SEARCH RESULT UPDATE MECHANISM

CROSS-REFERENCE TO RELATED APPLICATIONS

The present application is based on, and claims priority from, U.S. Prov. Appln. No. 60/823,370, filed Aug. 23, 2006, the contents of which are incorporated herein by reference in their entirety.

FIELD OF THE INVENTION

The present invention relates to computer search systems, and more particularly relates to a method that allows database queries to be saved and an efficient mechanism that matches records whenever they are added or modified to all of the saved queries.

BACKGROUND OF THE INVENTION

In computer applications across the world, including search engines and other search sites (e.g. job searches, auto and home sales sites, dating sites, etc.), databases and the Structured Query Language (SQL) are used extensively to manage large volumes of relevant information. A database often contains one or more tables which contain rows (i.e. records) that store data. Each table is uniquely identified by a name and each row is typically uniquely identified by one or more identifiers. The table stores information about a class of data, for example the Person table will store the name and address of persons. A row in the address table stores a distinct instance of a person, like "President George W. Bush, 1600 Pennsylvania Ave NW, Washington D.C. 20500". The tables are also organized into columns that uniquely describe a property of the data class the table is used to define. The Person table typically is organized using the columns 'Name, Street Address, City, state and Zip'.

| Name | Street Address | City | State | Zip |
|---|---|---|---|---|
| George W Bush | 1600 Pennsylvania Ave | Washington | DC | 20500 |
| John Doe | 1 Main street | New York | NY | 10001 |
| Jane Doe | 10 Maple Ave | Hollywood | CA | 90210 |

SQL Queries are used to effectively store and retrieve information from these tables. The SQL select statement is used extensively in computer applications to retrieve data from database tables. The SQL Select statement is used to select data from tables. It returns a result set which in turn is in the form of a table. The select statement is typically of the following form.

Select Column name [, column name . . . ]
From Table name
Where [Column name operator Value [and/or Column name operator Value]]

In the above statements, everything between pairs of brackets ("[" and "]") is optional. The Where clause in the SQL Select statement is used to specify a selection criterion, that filters the data that is selected from the table. Each Column name operator Value is a criterion condition that contributes as a sieve in the filtering of the data to be returned in the result set.

For example, using the example Person table shown above, the following SQL Select statement
Select Name
From Person
Where STATE='NY' or STATE='CA'
Will return the following values from the above table:

| Name |
|---|
| John Doe |
| Jane Doe |

In this example the first record is not returned because the value for STATE in the record did not match either of the conditions and therefore does not filter through.

The following are valid operators allowed per SQL standards.

| Operator | Description |
|---|---|
| = | Equal |
| < > | Not equal |
| > | Greater than |
| < | Less than |
| >= | Greater than or equal |
| <= | Less than or equal |
| BETWEEN | Between an inclusive range |
| LIKE | Search for a pattern |

The Boolean operators 'AND' and 'OR' are used in where clauses to connect simple conditions to make compound conditions. The 'AND' operator returns rows that match all the conditions connected by it. The 'OR' operator returns rows that match any one of the conditions connected by it.

These types of SQL queries are extremely prevalent in computer applications across the world. One common area where the end user input is translated into SQL queries is in classified searches on the internet. An example of this is found in online job portals, where Job seekers can search for Job Listings by inputting the search criteria in a search form. The site then returns all the Job Listings that match the inputted criteria. In this scenario the criteria input by the user in the search form is translated into a SQL query and executed. The result set returned by the query is then formatted and displayed back to the user.

There are inherent deficiencies in this approach. The search, as well as the underlying SQL query returns a point-in-time snapshot of the results. Meanwhile, the data that is being searched is continuously updated. This results in a situation where there is a need for the search function to be performed multiple times and this is accomplished by re-executing the SQL Query. In the Job Search example either the Job seeker has to intermittently re-submit the search or the SQL query has to be re-executed intermittently. The first option causes inconvenience to the user and both the options are expensive in terms of computational resources.

It would be desirable for the user that is performing the search to save the search and for the application to notify the user whenever any new data that matches the search gets added to the database. Most of the current applications lack this feature and the few applications that support this feature use the technique of performing the SQL queries multiple times on an intermittent basis. While this expensive option avoids the need for the user to re-submit the search intermittently and frequently, in cases where time is of the essence the user does not get notified as soon as a matching record is added.

SUMMARY OF THE INVENTION

This invention proposes a method/algorithm that allows database queries to be saved and an efficient mechanism that matches records whenever they are added or modified to all of the saved queries and returns the list of those queries that match a given record as soon as the record is added or modified. If used in an online search portal example (e.g. a job search site), this invention would allow the searcher to submit and save his search criteria once and the application would return the listings that match the search criteria at that point in time and will also automatically match any new listings that get added after the query gets saved and if a match occurs would notify the user of the listing as soon as the listing is added. This matching on new listings to the saved search will happen continuously until the search is removed.

According to an aspect of the invention, by matching a record that is added or changed to the database to all saved queries, it provides convenience to the users and it also reduces the computational cost to achieve the same result relative to other existing techniques to address the same scenario.

In furtherance of these and other aspects, a method according to the invention includes receiving a query for identifying a set of data among a plurality of sets of data, parsing the query according to a plurality of condition indices, storing the condition indices as updated by the parsing step and associating the query with the stored condition indices, and comparing a new or changed set of data to the stored condition indices and identifying the associated query if there is a match.

In additional furtherance of these and other aspects, a method according to the invention includes providing a query tool and a database of records accessible via an online portal, receiving a query from a user via the online portal, using the query tool to perform a search of the database, and returning search results to the user, parsing the query to extract its conditions and saving the query and its associated extracted conditions, receiving a new or changed record for storing in the database, comparing the received record against the extracted conditions to determine whether the search results for the associated query are changed by the received record, and notifying the user if it is determined that the search results are changed.

In additional furtherance of these and other aspects, an apparatus for searching for records in a table according to the invention includes a query processor that is adapted to parse a received query according to a plurality of condition indices, store the condition indices as updated by the parsing, and to associate the query with the stored condition indices, and a query matching processor that is adapted to compare a new or changed record to the stored condition indices and to identify the associated query if there is a match.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 4A to 4E illustrate a process of creating node and node branch tables for like conditions in accordance with an embodiment of the invention;

DETAILED DESCRIPTION OF THE PREFERRED EMBODIMENTS

Figure 1:
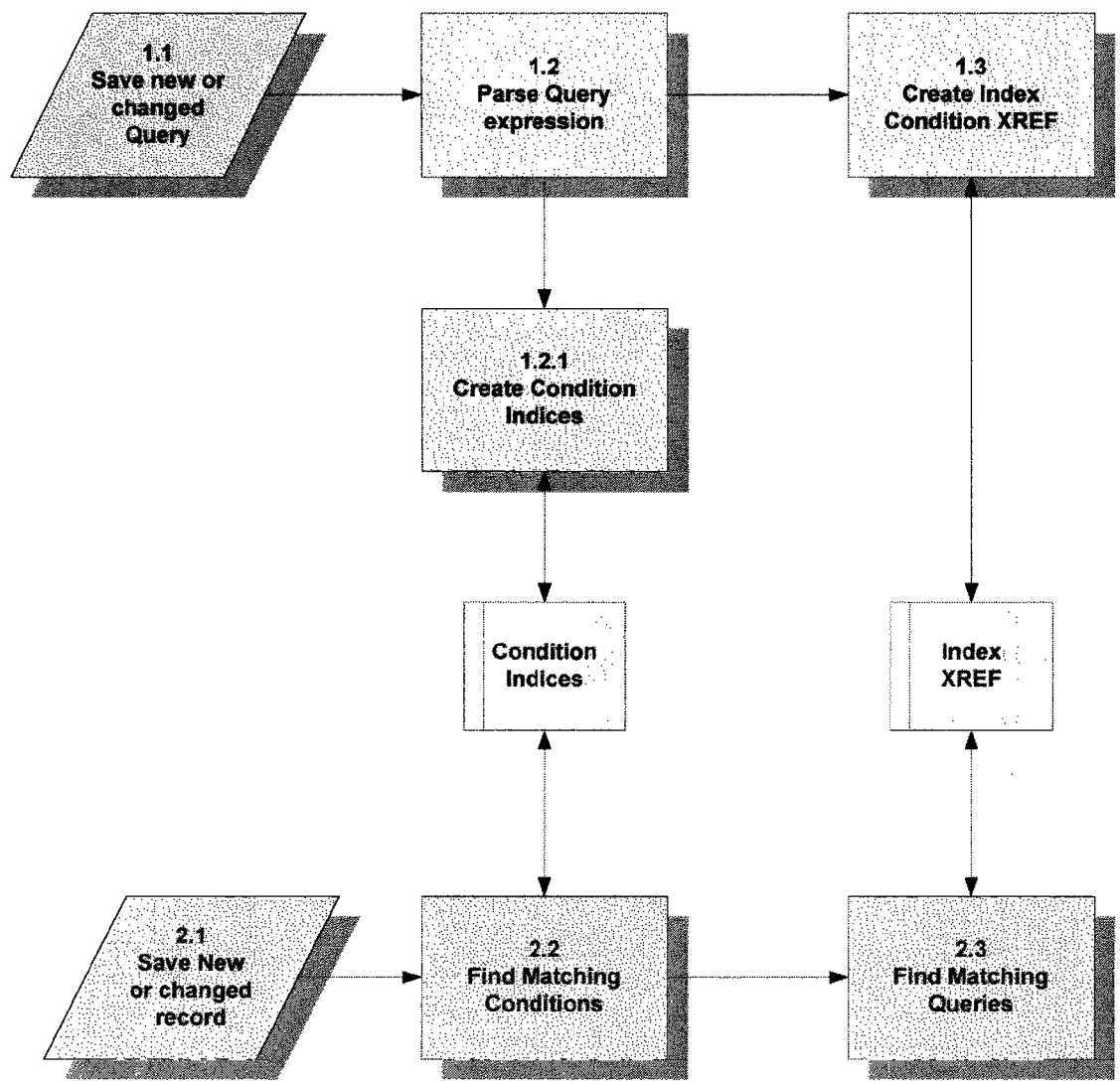
FIG. 1 is a flowchart illustrating an example algorithm according to general aspects of the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to one general aspect, the invention comprises an algorithm that matches data against search or filter rules that are saved in an efficient manner. In the following paragraphs, the invention will be described in connection with one example application of sets of data stored as records in a database, and search or filter rules comprising queries such as SQL queries. However, the invention is not limited to this example application, but includes any form of data and rules for analyzing that data, such as data streams and sets of data with associated fields, and rules such as a Boolean rule with conditions for various combinations of these fields. Those skilled in the art will recognize the various applications of the invention after being taught by the present disclosure.

In order to simplify the explanation of one example of an algorithm according to the invention, the following job seeker Table 1 with its data is used as an illustrative example.

TABLE 1

| Row Num ID-1 | Name ID-2 | Skills ID-3 | Location ID-4 | Education Level ID-5 | Career Level ID-6 | Work status ID-7 | Job Type ID-8 | Company Categories ID-9 |
|---|---|---|---|---|---|---|---|---|
| 1 | John Doe | Java, .net J2EE | NY | M | XP | FT | C | IT |
| 2 | Jane Doe | .net, MCSE, MS ACCESS | NJ | B | XP | FT | E | IT |
| 3 | John Smith | CPA, IRS and State Audit | MA | M | M | FT | E | ACCT |
| 4 | Jane Smith | CPN, First Aid, Physical therapy | MA | A | XP | FT | E | HC |
| 5 | Jack Smith | ORACLE, 10G, Data warehouse | CA | B | E | FT | E | IT |
| 6 | Jill Smith | IP, Corporate, Legal Asst | DC | B | S | PT | I | LG |
| 7 | Jim Smith | Sales Manager, Marketing strategist | IL | M | EX | FT | E | INS |
| 8 | Jackie Doe Smith | Airbus, Boeing, Mechanic | TX | B | XP | FT | E | AIR |

The values in the example table above follow the convention described below. For Location state abbreviation codes are used. For Education Level the following abbreviations are used: M—Masters; B—Bachelors; A—Associate. For Career Level the following breviations are used: XP—Experienced non Manager; M—Manager; E—Entry Level; S—Student; EX—Executive. For Work Status the following abbreviations are used: FT—Full Time; PT—Part Time. For Job Type the following abbreviations are used: C—Contract; I—Intern; E—Employee. For Company Categories the following abbreviations are used: IT—Information Technology; ACCT—Accounting; HC—Health Care; LG—Legal; INS—Insurance; AIR—Airline.

Each row in the table corresponds to one record. For example, the following row corresponds to a complete record for a job seeker named John Doe:

| Name | Skills | Location | Education Level | Career Level | Work status | Job Type | Company Categories |
|---|---|---|---|---|---|---|---|
| John Doe | Java, .net J2EE | NY | M | XP | FT | C | IT |

Before explaining an example algorithm according to the invention in more detail, it is useful to outline how simple queries are matched against multiple records in database tables. In this context consider the following query:

Select * from Jobseekers where

CONTAINS (Skills, '.net') and

Location in ('NY', 'NJ') and (Job Type='E' or

Work Status='FT')

Execution of this query will return the following rows (i.e. records) from Table 1:

| Row Num | Name | Skills | Location | Education Level | Career Level | Work status | Job Type | Company Categories |
|---|---|---|---|---|---|---|---|---|
| 1 | John Doe | Java, .net J2EE | NY | M | XP | FT | C | IT |
| 2 | Jane Doe | .net, MCSE, MS ACCESS | NJ | B | XP | FT | E | IT |

All the other rows in the table do not match the expression in the "where" clause of the query. A breakup of the query is illustrated below:

Select * from Jobseekers where

CONTAINS (Skills, '.net') and—Condition 1

Location in ('NY', 'NJ') and—Condition 2

(Job Type='E' or—Condition 3

Work Status='FT');—Condition 4

For any row in the table to be selected, both Conditions 1 and 2 must be true and either of Conditions 3 and 4 must be true. In this example only row numbers 1 and 2 satisfy the expression in the "where" clause.

When searching tables with a large number of records, search algorithms commonly use indices on the data. For example, the above table, if indexed on keywords, will help retrieve all the records that matched Condition 1 rapidly. Once all rows that match condition 1 are identified, these rows are then evaluated for the other conditions. At the end of the process all the rows (in this case, rows 1 and 2) that match the expression are returned as a result set.

Similarly, according to certain general aspects, an algorithm according to the invention matches a large number of queries to a single record by the process of whittling down the queries using indices that are built on specific values for attributes based on the given conditions. These condition indices are built such that when given a distinct value for an attribute they rapidly return all the matching conditions and correspondingly all the queries upon which these are based.

FIG. 1 is a flowchart illustrating one example algorithm according to general aspects of the invention.

As shown in FIG. 1, there are two major process flows in the algorithm. The "Save Query" process flow (blocks 1.1 to 1.3) describes all the steps that are performed when each query is saved and the "Match Record to Saved Queries" process flow (blocks 2.1 to 2.3) describes the steps that are performed when any record is added or updated in the application.

In general, in the "Save Query" process flow, after any new query is received or changed in step 1.1, in step 1.2 the query is parsed and all the required indices are created and stored in a rapid retrieval data store (block 1.3). In the "Match Record to Saved Queries" process flow, the indices are used and any queries that match a new or changed record (received in step 2.1) are all identified and returned in a result set (steps 2.2 and 2.3).

Example implementation details of an algorithm according to certain embodiments of the invention will now be provided with reference to the process flow in FIG. 1.

Step 1.1 refers to any triggering step that can invoke the algorithm of the invention. Depending on the application, either from within the database or from an external database, the process will be notified of a new or changed query. This event triggers the "Save Query" process flow. In one example, an interface from the calling application will provide the complete query expression, and the process will return a success or failure notification with appropriate messages.

The first step in the "Save Query" process flow is the parse query step 1.2. In one example implementation, in this step the expression in the where clause of a SQL query is parsed into individual conditions. The expression in the where clause is then expressed in its Boolean form using the parsed condition names. The Boolean expression is then reduced to its disjunctive normal form. Finally the expression is converted to the Algebraic Disjunctive Normal form to facilitate evaluation.

For example, considering example query 1, from the expression in its where clause:

CONTAINS (Skills, '.net') and—Condition—C1
Location in ('NY', 'NJ') and—Condition—C2
(Job Type='E' or—Condition—C3
Work Status='FT');—Condition—C4

The conditions are thus identified as follows:
C1=CONTAINS (Skills, '.net')
C2={Location in ('NY', 'NJ')}
C3={Job Type='E'}
C4={Work Status='FT'}

The expression is then expressed in its Boolean form as:

$$Q1 = C1 \text{ and } C2 \text{ and } (C3 \text{ or } C4).$$

Reducing the Boolean form of the expression to its disjunctive normal form involves making the expression as a sum of products. For example, Query Q1 in its disjunctive normal form is:

$$Q1 = (C1 \text{ and } C2 \text{ and } C3) \text{ or } (C1 \text{ and } C2 \text{ and } C4).$$

One thing to notice in this form is that when any subpart of the expression separated by the "OR" operator becomes true the expression becomes true. Converting this to the algebraic disjunctive normal form involves substituting the + sign for "OR" and the * sign for "AND". This way the algebraic disjunctive normal form of the Query Q1 is:

$$Q1 = (C1 * C2 * C3) + (C1 * C2 * C4).$$

In addition, when reducing the expression to disjunctive normal form, the not conditions are simplified using De Morgan's law. An observation of De Morgan's law is:

NOT ($C1$ AND $C2$)=(NOT($C1$) OR NOT ($C2$))

NOT ($C1$ OR $C2$)=(NOT($C1$) AND NOT ($C2$))

This allows the expression to only have NOT associated with individual conditions and not conjunctive or disjunctive sets.

To optimize performance, a master table that maps Attribute IDs' to condition types is maintained. This indicates all possible condition types that need to be searched for a given attribute. In one example of the invention, it is implemented as an "Attribute Condition XREF" table. It has two columns: "Attribute ID" and "Condition Type". The following rows are inserted into this table corresponding to the parsing of the example query Q1, assuming it is the first query added to the system:

TABLE 2

| Attribute ID | Condition Type |
| --- | --- |
| 3 | CONTAINS |
| 4 | IN |
| 8 | EQUALS |
| 7 | EQUALS |

Referring back to FIG. 1, the parsing step includes a step 1.2.1 of creating condition indices. In SQL, indices are created on a table to locate rows more quickly and efficiently. The indices in SQL are created on one or more columns of the table. Any given table can have multiple indices and each index is given a unique name. The indices are generally implemented as additional tables which have the value of the indexed columns with pointers to the actual rows in which these values occur.

In one example of the invention, once the expression in the where clause is simplified and the query is parsed into its component conditions, corresponding to each unique condition, indices are created. The condition indices depend on the attribute and the operator used in the condition. There will be an index corresponding to each unique combination of an attribute and operator that is used in the conditions.

The condition indices are implemented as tables that have pointers to conditions that are true for the given "value or set of values" and queries that use these conditions. The condition indices store distinct values or ranges of values and pointers to the actual conditions that will be true for the values and queries that use these conditions. The type of the condition indices are dictated by the operator used in the condition.

Among the operators, the following are considered to be range operators and all of these can be reduced to the BETWEEN form as shown in the table below.

| Operator | Description | operand | Equivalent between |
| --- | --- | --- | --- |
| > | Greater than | N | BETWEEN (N + 1 and +∞) |
| < | Less than | N | BETWEEN (−∞ and N − 1) |
| >= | Greater than or equal | N | BETWEEN (N and +∞) |
| <= | Less than or equal | N | BETWEEN (−∞ and N) |

The LIKE operator actually has three variations: (1) Begins with; (2) Ends with; and (3) Part of. Because of the difference in how these are handled in one example of the invention, these variations of the LIKE operator are indexed separately. In addition, the IN operator also is indexed using a variation of the EQUALS index. The following descriptions illustrate the indexing mechanism used for each type of condition.

The "Equals" Condition Index maps in a set of tables all the distinct values of columns that are used in conditions that have an "Equals" operator and the unique condition Identifiers. The Unique Identifier of the column, the value and the unique identifier for the condition and other fields related to the condition are stored in the Equals Index. Using this index given a distinct value for the column all the "Equals" conditions that are true for the given column value are returned.

In one example implementation, two tables each are used to create the "Equals' condition index for each type of attribute such as text, numeric and date. The Text "Equals Condition Index" is implemented using the "Text Value Index" and the "Index Conditions" tables described below.

The "Text Value Index" table consists of the following columns: (1) "Index ID" data type Numeric; (2) "Attribute ID" data type Numeric; and (3) "Text Value" data type Text. This table shall have a primary key of "Index ID". The Index ID is generated as a running sequence number every time a new unique combination of an Attribute and a value are added.

The "Index Conditions" Table is common across all types of condition indices and it consists of the following columns: (1) "Index ID" data type Number; (2) "Query Number" data type Numeric; (3) "Query Part Number" data type Numeric; (4) "Number of Conditions in Part" data type Numeric. This table has a primary key composed of "Index ID", "Query Number" and "Query Part Number".

These two tables are linked using the column "Index ID". For example, consider Condition C3 of the example query Q1. C3={Job Type='E'}. This is an "Equals" condition. The first time the Value "E" is used with the column "Job Type" in an "Equals" condition a row is added to the "Text Value Index" table. In the example job seeker Table 1, the Job Type column has an attribute ID of 8. Thus a row is added in the "Text Value Index" table with the following values

| Index ID | Attribute ID | Value |
|---|---|---|
| 1 | 8 | 'E' |

Condition C4={Work Status='FT'} of the example query Q1 will cause the following row to be added in the "Text Value Index" Table.

| Index ID | Attribute ID | Value |
|---|---|---|
| 2 | 7 | 'FT' |

Similarly, "Numeric Equals" condition Index and "Date Equals" Condition Index are created with the only difference being the "Numeric Value" and "Date Value" columns replacing the "Text Value" column. The structure of the "Numeric Value Index" and the "Date Value Index" tables are described below.

The "Numeric Value Index" table consists of the following columns: (1) "Index ID" data type Numeric; (2) "Attribute ID" data type Numeric; and (3) "Number Value" data type Numeric. This table shall have a primary key of "Index ID".

The "Date Value Index" table consists of the following columns: (1) Index ID" data type Numeric; (2) "Attribute ID" data type Numeric; and (3) "Date Value" data type Date This table shall have a primary key of "Index ID". The Date Value Index and the Numeric Value Index tables are also linked to the "Index Conditions" table using the "Index ID" Column. The Date Value Index is used for all variations of Date like, DateTime, Julian Date including all formats.

The "In" operator is also handled using the same set of tables that are used for the "Equals" operator. While the conditions using the "Equals" operator result in one row in the "Value Index" tables, there will be as many "Value Index" rows as there are operands in the condition. Corresponding to each term in the "In" condition, one row is inserted into the "Value Index" table, with the Unique Identifier of the column, the value of the term and the "Index ID".

For example, consider the condition C2 in the example query Q1. C2={Location in ('NY', 'NJ')}. This is an "In" condition. It has two terms 'NY' and 'NJ' in the operand. In the example table the column Location has an ID of 4. Corresponding to this condition, two rows will be inserted into the TEXT Value index as follows.

| Index ID | Attribute ID | Value |
|---|---|---|
| 3 | 4 | 'NY' |
| 4 | 4 | 'NJ' |

Also in the Index Conditions table the condition will be mapped to both the "Index IDs" 3 and 4. Similar to the "Equals Condition" Indices, the "In Condition" Indices also use the "Text Value Index", "Numeric Value Index" and "Date Value Index" tables depending on the data type of the column used in the condition.

The "Not Equals" Condition Indices are used to map specific column values to "Not Equals" Conditions. The principle used in the "Not Equals" Condition Indices is that all the "Not Equals" Conditions are always true except when there is a match on the value, "column ID" pairs. Given a Column—Value pair, all the "Not Conditions" involving the column can be rapidly retrieved using this Index. This is achieved by using the Index to locate the conditions that used the value equal to the given value and removing these from the entire set of NOT conditions involving the given column.

In one example of the invention, the "Not Condition" Indices are implemented using the "Not Text Value Index", "Not Date Value Index" and the "Not Numeric Value Index" tables in conjunction with the "Index Conditions" table.

The "Not Text Value Index" table consists of the following columns: (1) "Index ID" data type Numeric; (2) "Attribute ID" data type Numeric; and (3) "Text Value" data type Text. This table shall have a primary key of "Index ID". This table is linked to the Index Conditions table using the "Index ID" column.

For example, consider the following example conditions, all on the column Career Level (ID=6).
C5={Career Level Not="XP"}
C6={Career Level Not="M"}
C7={Career Level Not="E"}
C8={Career Level Not="S"}
C9={Career Level Not="EX"}

Corresponding to these conditions the "Not Text Value Index" table will be populated as follows.

| Index ID | Attribute ID | Value |
|---|---|---|
| 5 | 6 | "XP" |
| 6 | 6 | "M" |
| 7 | 6 | "E" |
| 8 | 6 | "S" |
| 9 | 6 | "EX" |

In this example, if the true conditions need to be retrieved for a value of "M" in the "Career Level" column, first all the index IDs corresponding to the column "Career Level" are retrieved from the "Not Text Value Index". This makes the set 5, 6, 7, 8 and 9. Now the Index ID corresponding to "M" which is 6 is removed from the set. This results in an Index ID set of 5, 7, 8 and 9. Now all the conditions for these 4 Index IDs are retrieved from the Index Conditions table.

Similarly, "Numeric Not Equals" condition Index and "Date Not Equals" Condition Index are created with the only difference being the "Numeric Value" and "Date Value" columns replacing the "Text Value" column. The structure of the "Not Numeric Value Index" and the "Not Date Value Index" tables are described below.

The "Not Numeric Value Index" table consists of the following columns: (1) "Index ID" data type Numeric; (2) "Attribute ID" data type Numeric; and (3) "Number Value" data type Numeric. This table shall have a primary key of "Index ID".

The "Not Date Value Index" table consists of the following columns: (1) "Index ID" data type Numeric; (2) "Attribute ID" data type Numeric; (3) "Date Value" data type Date. This table shall have a primary key of "Index ID". The "Not Date Value Index" and the "Not Numeric Value Index" tables are also linked to the "Index Conditions" table using the "Index ID" Column.

The "Not In" operator is also handled using the same set of tables that are used for the "Not Equals" operator in conjunction with the "Not In XREF" table. While the conditions using the "Equals" operator result in one row in the "Not Value Index" tables, there will be as many "Not Value Index" rows as there are operands in the "Not in" condition. Corresponding to each term of the "Not In" condition, one row is inserted into the "Not Value Index" table. The Unique Identifier of the column, the value of the term and the "Index ID" are inserted into the "Not Value Index" table. In the "Not In XREF" table a unique Index ID for each "Not In" Condition is inserted mapped to each of the Index Ids corresponding to each term of the "Not In" Condition. The Index Conditions table maps the condition to the Index ID of the "Not In XREF" table.

For example, consider the condition C10={Career Level Not in ("M", "E")}. This is a "Not In" condition. It has two terms 'M' and 'E' in the operand. Corresponding to this condition, two rows will be inserted into the "Not Text Value index" as follows if these values do not already exist in the table.

| Index ID | Attribute ID | Value |
|---|---|---|
| 10 | 6 | "M" |
| 11 | 6 | "E" |

In addition the following rows are inserted into the "Not In XREF" table.

| Index ID | Attribute ID | Value Index ID |
|---|---|---|
| 12 | 6 | 10 |
| 12 | 6 | 11 |

Also in the Index Conditions table the condition CIO will be mapped to the "Index ID" 12.

If any of the values already exist in the "Not Text Value index" the rows are not inserted, rather, in the "Not In XREF" table the condition will be mapped to Index IDs corresponding to the existing rows.

In other words, for example, assume the "Not Text Value index" table looks as follows before the addition of the condition C10={Career Level Not in ("M", "E")}:

| Index ID | Attribute ID | Value |
|---|---|---|
| 5 | 6 | "XP" |
| 6 | 6 | "M" |
| 7 | 6 | "E" |
| 8 | 6 | "S" |
| 9 | 6 | "EX" |

In this situation, the new rows are not added, instead the "Not In XREF" shall have rows as follows.

| Index ID | Attribute ID | Value Index ID |
|---|---|---|
| 12 | 6 | 6 |
| 12 | 6 | 7 |

Similar to the "Not Equals Condition" Indices, the "Not In Condition" Indices also use the "Not Text Value Index", "Not Numeric Value Index" and "Not Date Value Index" tables depending on the data type of the column used in the condition in addition to the "Not In XREF" table.

As discussed in the parse query section, the following are considered to be range operators and all of these can be normalized to the between form as follows.

| Operator | Description | operand | Equivalent between |
|---|---|---|---|
| > | Greater than | N | BETWEEN (N + 1 and +∞) |
| < | Less than | N | BETWEEN (−∞ and N − 1) |
| >= | Greater than or equal | N | BETWEEN (N and +∞) |
| <= | Less than or equal | N | BETWEEN (−∞ and N) |

In addition NOT BETWEEN (N and M) is normalized to {BETWEEN (−∞ and N−1) OR BETWEEN (M+1 and +∞)}.

This type of normalization requires only one index for all of these range operators. The "Between Condition Index," also called "Range index," enables rapid and efficient determination of all range conditions that are true for a given value of a column. Because of the sequential nature of the ranges these are typically implemented only for Numeric and DATE attributes. For TEXT attributes ranges can be implemented by choosing any one of standard character sequences that are known in the art (such as ASCII, etc.).

A range is specified by a lower limit and an upper limit. In one example of the invention, all ranges for a query are converted to as few as one all-inclusive between range, where the upper and lower limits of all the ranges are within the converted range(s). A range index table in essence is a mapping between several non-overlapping intervals and the conditions that are true for any value within that interval. Thus, for any given value of a particular column, if the interval in which this value falls is determined then, all the conditions that are true for the column value are determined very rapidly.

For example, consider a real estate database, with "Home price" as one of the columns, and the following conditions.

C1={"Home Price" Between 200001 and 300000}
C2={"Home Price" Between 250001 and 400000}
C3={"Home Price" Between 200001 and 400000}
C4={"Home Price" Between 500001 and 600000}
C5={"Home Price" Between 350001 and 600000}

Figure 2A:
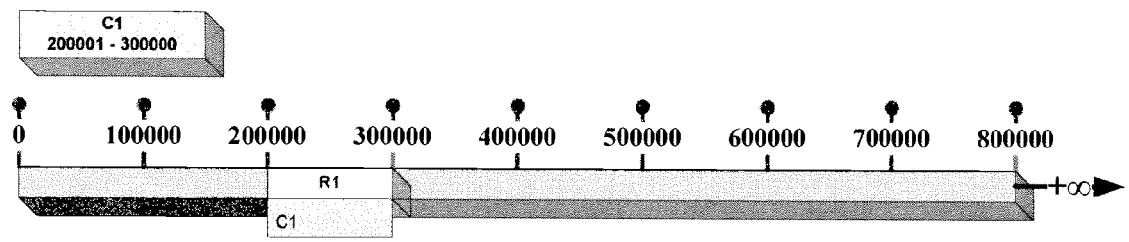
FIGS. 2A to 2E illustrate a process of creating range index condition tables in accordance with an embodiment of the invention.

The first Condition C1 is indexed by creating a row in the Range index table with the interval of 200001 to 300000. This row is mapped to the condition C1. The result is graphically illustrated in FIG. 2A, which illustrates what happens after adding this condition the "Home Price" Range Index. At this point using this index, the condition C1 will be deemed true for any value of "Home Price" that falls within this interval of (200001~300000) all other values will have no true conditions.

Figure 2B:
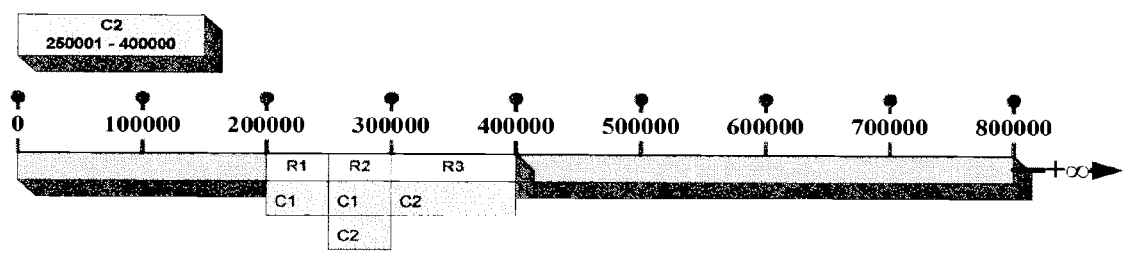

Adding the condition C2 causes modification of the interval of the existing row and addition of one more row to the range index table. The lower limit of the new condition 250001 falls in the middle of the interval {200001~300000). As shown in FIG. 2B, this causes the splitting of the original row into two rows with intervals of R1 (200001~250000) and R2 (250001~300000). Also another row with interval R3 (300001~400000) is created to cover the range specified in the condition. Condition C1 is now mapped to rows R1 and R2 and Condition C2 is mapped to rows R2 and R3.

At this point using this index, the condition C1 will be deemed true for any value of "Home Price" that falls within the interval of (200001~250000), C1 and C2 will be deemed true for all values that fall within the interval of (250001~300000), the condition C2 will be deemed true for all values that fall within the interval of (300001~400000) and all other values will have no true conditions.

Figure 2C:
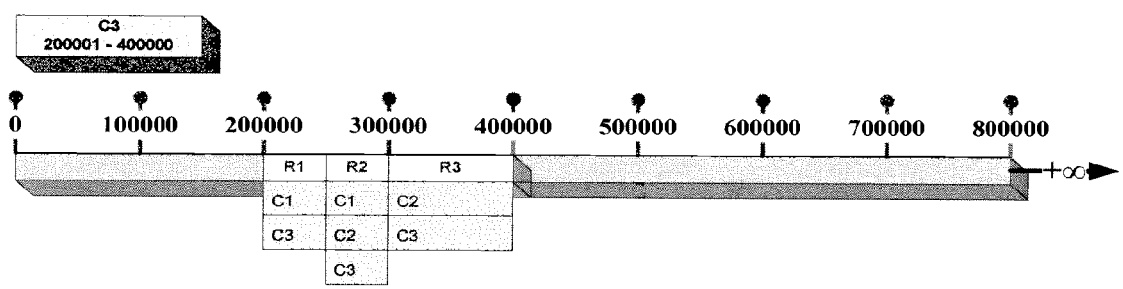

When adding the condition C3 the entire range is covered by the three intervals in the rows R1, R2 and R3, therefore no new range index rows are added. The condition C3 is mapped to all the three rows. This is illustrated in FIG. 2C.

At this point using this index, the conditions C1 and C3 will be deemed true for any value of "Home Price" that falls within the interval of (200001~250000), C1, C2 and C3 will be deemed true for all values that fall within the interval of (250001~300000), the conditions C2 and C3 will be deemed true for all values that fall within the interval of (300001~400000) and all other values will have no true conditions.

Figure 2D:
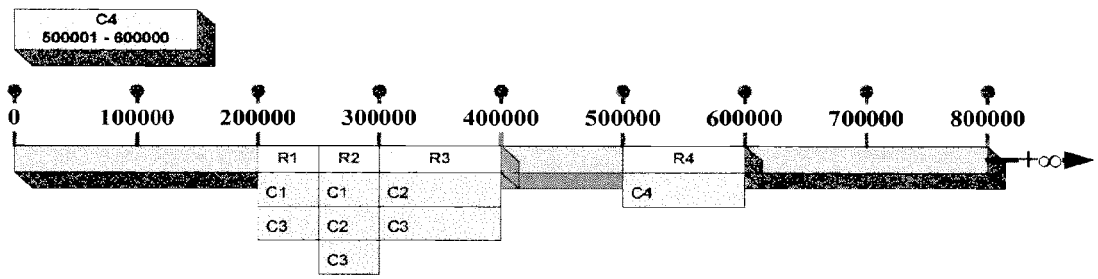

The Condition C4 has a range that is completely outside of all existing row intervals, therefore when it is added a new row R4 whose interval is equal to the condition range is added and the condition C4 is mapped to this row. This is illustrated in FIG. 2D.

At this point using this index, the conditions C1 and C3 will be deemed true for any value of "Home Price" that falls within the interval of (200001~250000), C1, C2 and C3 will be deemed true for all values that fall within the interval of (250001~300000), the conditions C2 and C3 will be deemed true for all values that fall within the interval of (300001~400000), C4 will be deemed true for all values that fall within the interval of (500001~600000) and all other values will have no true conditions.

Figure 2E:
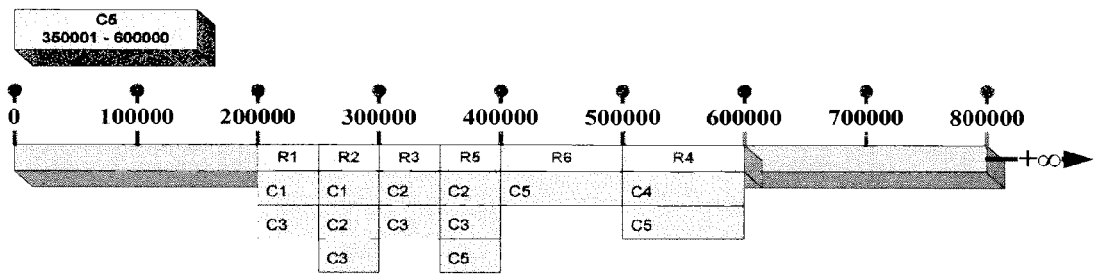

Adding the condition C5 causes modification of the interval of the existing row (R3) and addition of one more row to the range index table. The lower limit of the new condition 350001 falls in the middle of the interval {300001~400000). This causes the splitting of the original row (R3) into two rows with intervals of R3 (300001~350000) and R5 (350001~400000). Also another row with interval R6 (400001~500000) is created to cover the remaining range specified in the condition. Condition C1 is now mapped to rows R3, R5, R6 and R4. This is illustrated in FIG. 2E.

At this point using this index, the conditions C1 and C3 will be deemed true for any value of "Home Price" that falls within the interval of (200001~250000), C1, C2 and C3 will be deemed true for all values that fall within the interval of (250001~300000), the conditions C2 and C3 will be deemed true for all values that fall within the interval of (300001~350000), the conditions C2, C3 and C5 will be deemed true for all values that fall within the interval of (350001~400000), C5 will be deemed true for all values that fall within the interval of (400001~500000), C4 and C5 will be deemed true for all values that fall within the interval of (500001~600000) and all other values will have no true conditions.

In the example implementation according to the invention, assuming that the "Home Price" Column has an attribute ID of 10 the numeric range index table looks as follows.

| Index ID | Attribute ID | Lower Limit | Upper Limit |
| --- | --- | --- | --- |
| 21 | 10 | 200001 | 250000 |
| 22 | 10 | 250001 | 300000 |
| 23 | 10 | 300001 | 350000 |
| 24 | 10 | 500001 | 600000 |
| 25 | 10 | 350001 | 400000 |
| 26 | 10 | 400001 | 500000 |

The NumericRangeIndex and DateRangeIndex tables are designed such that there are no overlapping ranges. When a numeric or date attribute is added to the AttributeList table, the appropriate universal range is added into the NumericRangeIndex or DateRangeIndex table. Any range associated with an Attribute will then be a subset of this universal range. When a range is added, the existing ranges that encompass the lower and the upper limit of the new range are split. For example, consider a range (L,U) where L is its lower limit and U, its upper limit, that needs to added to the database. If there is a range (l,u) in the database that covers part of the range (L,U), for example (L,u), the range (l,u) is split into two ranges (1,L-1) and (L,u). Thus, whenever a range is added, at most two existing ranges are created, i.e. one that covers the upper limit and the one that covers the lower limit of the range.

A range specified in a condition typically maps to a set of ranges in the RangeIndex tables. Every range in the RangeIndex tables has a corresponding entry in the IndexXRef table. As the database grows, the ranges tend to get smaller and more in number. If it is desired to insert a broad range into a huge database, the number of records to be updated in the IndexXRef table can be very high. So, the aforementioned procedure to handle ranges proves to be expensive. To overcome this problem, one example of the invention incorporates a set of tables, namely the Higher(rderNumericRangeIndex and HigherOrderDateRangeIndex tables.

In this example, each numeric and date attribute is associated with a hierarchy of ranges. Henceforth, this hierarchy is referred to as the tree. Each node of the tree represents a range. The root stands for the universal range. The children nodes are the disjoint subsets of their parent and the union of the ranges represented by the children covers the parent range completely. Thus, the broadest range is represented by the root and the narrowest range by one of the leaves.

It should be noted that there does not need to be any regularity imposed on the width of a range or on the number of children a node can have. The entire tree can be pre-seeded based on an analysis of the nature of the attributes and the distribution of their values in the business problem. Each node also has a 'range order' number, which is the height of the node from the bottom of the tree. The root gets the highest range order and the leaves get the least. When a range is needed that is a subset of a leaf of the tree, a special node is added (for example, called 0-order node) representing that range to that leaf. The 0-order nodes are the ones that are added to the RangeIndex tables. All the other higher order nodes are pre-seeded in the HigherOrderRangeIndex tables.

Figure 3:
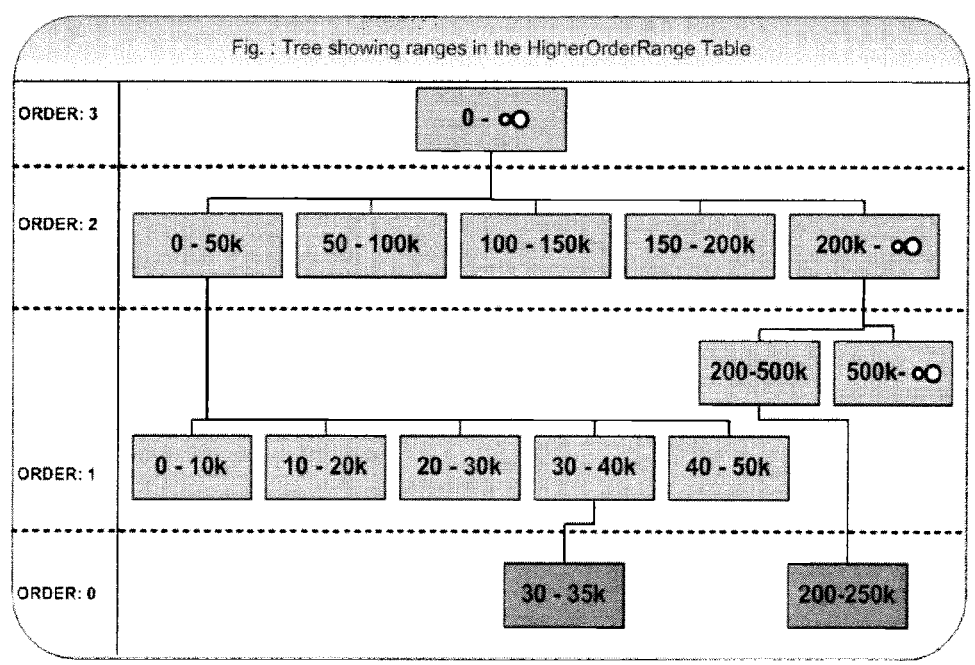
FIG. 3 illustrates a process of creating a higher order range index table in accordance with an embodiment of the invention.

Assume that for a particular attribute, a tree looks like the one shown in FIG. 3. As shown in this example, the 2-order range 0-50 k is divided into five 1-order ranges, while 2-order range 200 k-∞ is divided into two 1-order ranges (the reason being the high frequency of hits in the 0-50 k range). The root 0-∞ range has the highest order (3) and the order decreases down the tree.

If it is desired to add a range to the system, then the process starts parsing the tree top-down starting from the root. If a node is completely within the added range, then it is simply included in that node. If a node is broader than the added range itself or is broader than a part of the added range, then the children of that node are explored. If a node does not overlap with the added range, then the node is ignored. Thus, if the range 35,001-250 k is to be added, the process explores the children of the root because the root range (0-∞) is broader than the given range. The existing 2-order nodes 50-100 k, 100-150 k and 150-200k are completely within the given range. So these are simply included. Since the existing 2-order nodes 0-50 k and 200-∞ contain parts of the given range, the process explores their children.

Among the children of the 0-50 k node, the node 40-50 k is completely within the range while 30-40 k includes part of the range. Note that the 30-40 k node is a leaf and does not have any children to explore. So a 0-order node (30-35 k) is added to the existing 0-order 30-40 k node such that there is no overlap with any of the included nodes but cover the added range completely. Similarly, to the existing 0-order node 200-500 k, a 0-order node 200-250 k is added.

Since the tree is stored as records in the HigherrderRangeIndex table, the records in the IndexXRef table are updated corresponding to the included nodes. The 0-order nodes are added to the RangeIndex tables as described in the previous section. Thus, the HigherrderRangeIndex tables are kept static while 0-order nodes are inserted into the RangeIndex Table as queries are added. The RangeOrder column of the HigherOrderRangeIndex Table identifies the height of the node.

Ranges are seeded in such a way that the chances of finding a pre-seeded range is high for a frequently occurring range. This would also reduce the width of the 0-order ranges if any. In other words, if the probability of occurrence of ranges within a particular pre-seeded range is high, that range is divided into smaller sub-ranges. If sub-ranges of a particular range are expected to occur rarely, that range is sub-divided into larger (fewer) sub-ranges.

For example, consider a numeric attribute that gives the salary of a person. The universal range for this attribute would be 0 to ∞. The distribution of salary is expected to have its median around 70 k. Consider 2 ranges 60-80 k and 0-30 k. One would expect a high hit frequency within the former range and a low hit frequency in the latter. Thus, while the range 60-80 k is partitioned into, for example, twenty ranges, each with width 1000, the range 0-30 k is partitioned into just a couple of ranges. According to certain aspects, the invention preferably avoids re-dividing existing ranges because this causes copying of records.

The "Like" operator is used in SQL to match textual strings partially in columns. There are three variations of the "Like" operator. Consider the following conditions.

C20={Name Like 'John%'}. This would return all the rows in the table that have the name column beginning with "John". In the example table this would be rows 1 and 3. These types of conditions are called "Starts with" conditions.

C21={Name Like '%Smith'}. This would return all the rows in the table that have the name column ending with "Smith". In the example table this would be rows 3, 4, 5, 6, 7 and 8. These types of conditions are called "Contains" conditions.

C22={Name Like '%Doe%'}. This would return all the rows in the table that have the name column where "Doe" is part of it at any position. In the example table this would be rows 1, 2 and 8. These types of conditions are called "Part of" conditions.

The "Like" condition indices and the corresponding matching algorithm are designed with the objective of quickly and rapidly retrieving all Like conditions that match any given value of a column.

Unlike the other condition indices which are implemented as a table, the "Like Condition Index" is implemented using a "doubly linked tree" data structure in one example of the invention. Because of the need to effect partial matches a simple table is insufficient for the "Like" condition indices. A tree of alphabets is constructed using all the terms that are used in the "Like" Conditions. Three sets of trees are constructed, one for each of the three types of "Like" conditions.

Physically these trees may be implemented in a memory structure or using physical database tables. The Physical database implementation is discussed here. Two tables—Node and Node Branches tables—are used to implement the tree. A Root Node corresponding to each combination of starting attribute and every starting letter is built.

FIGS. 4A to 4E and the following descriptions illustrate one example of the structure of these tables.

To illustrate the construction of the tree, consider the addition of the following "Starts With" Like conditions assuming these are the first conditions.

C30={Name Like 'John%'}
C31={Name Like 'Jack%'}
C32={Name Like 'Joan%'}
C33={Name Like 'Johnson%'}

The root Node for all of these conditions is 'J'. Before adding the first term 'John' there are no child nodes for the root node 'J' and the 'J' tree looks as shown in FIG. 4A. As shown in FIG. 4A, the node 402 is labeled "J," its address is initialized to 1, address is NULL, since this root node has no parents, the number of children is initially 0, and "N" is used to indicate that this node is not for the end point of a term. Moreover, the list of child nodes is initially empty.

In one example, all the root nodes are typically created up front for each attribute for which the "Like" Condition is permitted in the application. For example, 78 root nodes could be created, three nodes for each letter of the alphabet, corresponding to the three types of Like conditions. Alternatively, this could be avoided depending on the specific application. At the least, the root nodes are created when a term is used in Like conditions starting with the character.

After the root node 402 is created, the node table in the database looks as follows.

| Index ID | Node String | Term End Point |
|---|---|---|
| 1001 | J | N |

There are no Node Branch records at this point.

After adding the first condition C30={Name Like 'John%'} a child node 404 gets added and the root node 402 gets updated appropriately and the tree looks as shown in FIG. 4B. Note that the term end point flag is marked Y for the child nod 404 because the Term in condition C30 ends at 'JOHN'. The significance of this field is explained in more detail below. As further shown, the root node 402 is further updated to show it has 1 child node, and the child node path and address are added to the first entry in the list of child nodes. More particularly, the node path is labeled "O" for the first letter following "J", and the child node address is initialized to 11. Correspondingly, the child node 404 is labeled "JOHN," its address is initialized to 11, its parent node address is set to 1, and its number of children is initialized to 0.

In the database one row is added to the node table and one row is created in the Node Branches table at this juncture as illustrated below.

Node Table:

| Index ID | Node String | Term End Point |
|---|---|---|
| 1001 | J | N |
| 1002 | JOHN | Y |

Node Branches Table:

| Parent Index ID | Branch Path | Child Index ID |
|---|---|---|
| 1001 | O | 1002 |

Figure 4C:
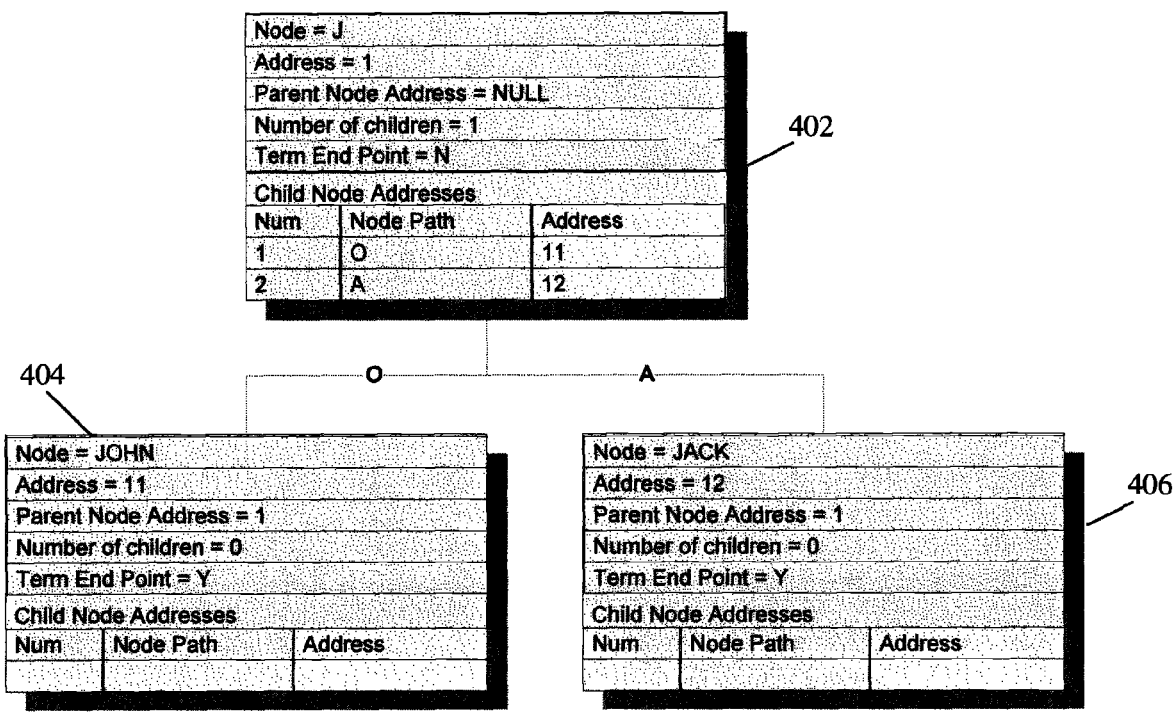

The addition of the condition C31={Name Like 'Jack%'} modifies the tree as shown in FIG. 4C. At this point there are two paths that can be traversed from the root node 402 one leads to the child node 404 for the term 'John' and the other to the newly added node 406 for the term 'Jack'. As further shown, the root node 402 is further updated to show it has 2 child nodes, and a new child node path and address are added to the second entry in the list of child nodes. More particularly, the node path is labeled "A" for the first letter following "J", and the child node address is initialized to 12. Correspondingly, the new child node 406 is labeled "JACK," its address is initialized to 12, its parent node address is set to 1, and its number of children is initialized to 0.

The database tables are modified as follows. The Node Table is modified as below:

| Index ID | Node String | Term End Point |
|---|---|---|
| 1001 | J | N |
| 1002 | JOHN | Y |
| 1003 | JACK | Y |

The Node Branches table is modified as:

| Parent Index ID | Branch Path | Child Index ID |
|---|---|---|
| 1001 | O | 1002 |
| 1001 | A | 1003 |

Figure 4D:
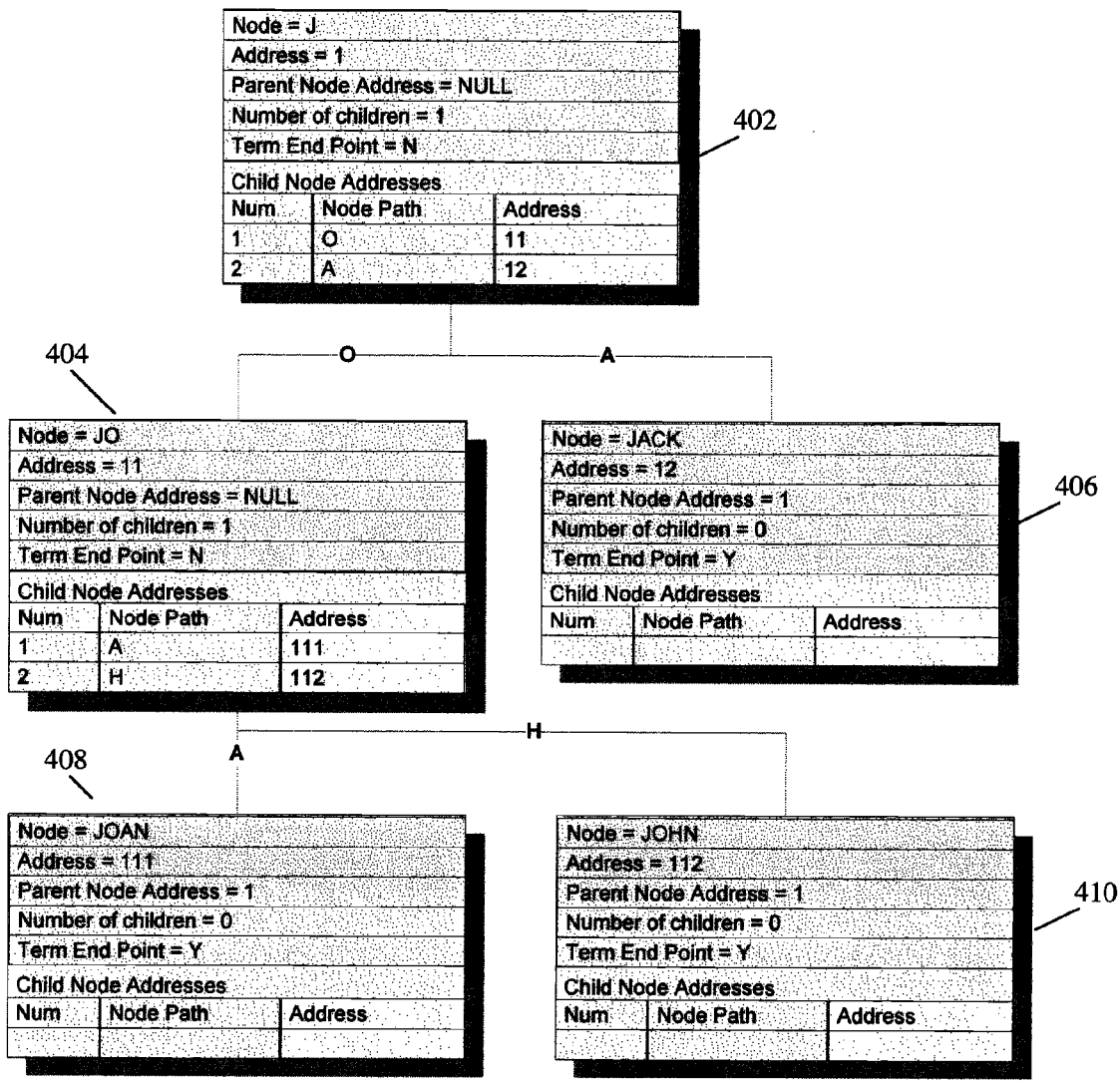

The addition of the condition C32={Name Like 'Joan%'} results in the modifications to the tree as shown in FIG. 4D. Note that because "Joan" begins with "Jo" like "John," this requires adding two child nodes to node 404 and changing node 404 to a parent node. As shown, the node 404 is updated to have a label "JO," and also to show it has 2 child nodes, the end point field is changed to "N" (because now the term does not end in "JO") and the two child node paths and addresses are added to the first entry in the list of child nodes in node 404. More particularly, the first node path is labeled "A" for the first letter following "JO", and the first child node address is initialized to 111. The second node path is labeled "H" for the first letter following "JO," and the second child node address is initialized to 112. Correspondingly, the first child node 408 is labeled "JOAN," its address is initialized to 111, its parent node address is set to 11, and its number of children is initialized to 0. Similarly, the second child node 410 is labeled "JOHN," its address is initialized to 112, its parent node address is set to 11, and its number of children is initialized to 0.

The database tables are modified as follows. The Node table is changed to:

| Index ID | Node String | Term End Point |
|---|---|---|
| 1001 | J | N |
| 1002 | JOHN | Y |
| 1003 | JACK | Y |
| 1004 | JO | N |
| 1005 | JOAN | Y |

The Node Branches table is changed to:

| Parent Index ID | Branch Path | Child Index ID |
|---|---|---|
| 1001 | O | 1004 |
| 1001 | A | 1003 |
| 1004 | H | 1002 |
| 1004 | O | 1005 |

Figure 4E:
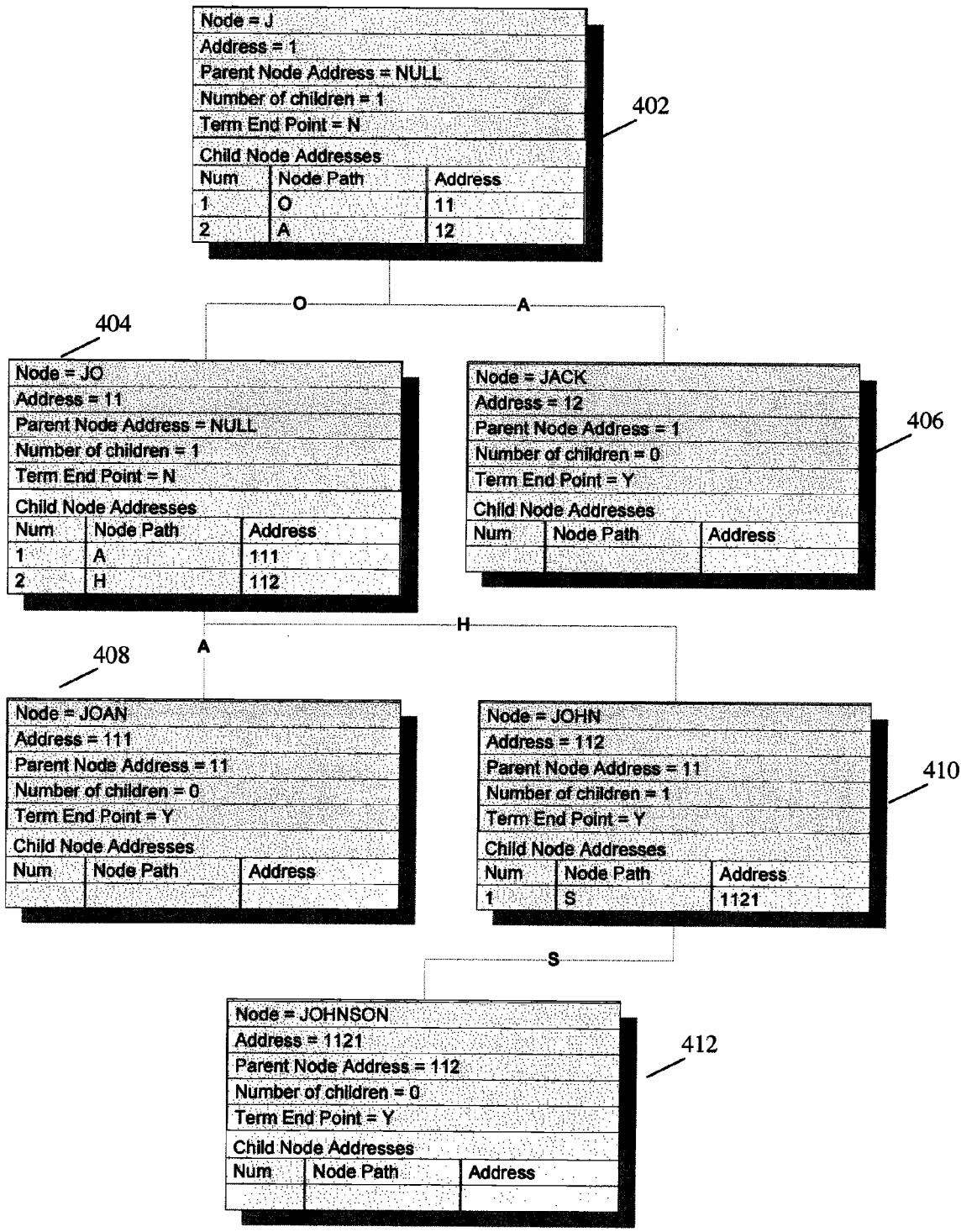

The addition of the condition C33={Name Like 'Johnson%'} transforms the tree as shown in FIG. 4E. Note that because "Johnson" begins with "John" like "John," this requires adding one child node to node 410 and changing node 410 to a parent node. As shown, the label for node 410 stay "JOHN." Meanwhile it is updated to show it has 1 child node, the end point field remains "Y" (because the term for "John" still ends in "JOHN") and a child node path and addresses are added to the first entry in the list of child nodes in node 410. More particularly, the node path is labeled "S" for the first letter following "JOHN", and the first child node address is initialized to 1121. Correspondingly, the new child node 412 is labeled "JOHNSON," its address is initialized to 1121, its parent node address is set to 112, and its number of children is intialized to 0. The database tables are modified as follows.

| Index ID | Node String | Term End Point |
|---|---|---|
| 1001 | J | N |
| 1002 | JOHN | Y |
| 1003 | JACK | Y |
| 1004 | JO | N |
| 1005 | JOAN | Y |
| 1006 | JOHNSON | Y |

The Node Branches table is modified to:

| Parent Index ID | Branch Path | Child Index ID |
|---|---|---|
| 1001 | O | 1004 |
| 1001 | A | 1003 |
| 1004 | H | 1002 |
| 1004 | O | 1005 |
| 1002 | S | 1006 |

These trees and the index conditions table are linked by connecting the "Node Key" of the tree to the "Index ID" column of the index conditions table.

In this example the "Starts with" like condition is indexed. The "Contains" like condition is also indexed in an exactly identical manner in its own tree.

For the "Ends with" type "Like" conditions, the term in the operand is reversed, starting with the last character, followed by the next to last character an so on until the first character and the reversed term is used to construct the tree. The tree itself and the fields in the node are identical for all three types of the "Like" condition.

Also, for each Column (Attribute ID) used, a separate tree is constructed. However, in physical implementations, the different trees for different columns may be stored in one physical database or memory structure.

The "Not Like" Condition Indices are used to map specific column values to the "Not Like" Conditions. The "Not Like" Condition Indices can be built in an exactly identical fashion to the "Like" Conditions. All the "Not Like" Conditions associated with a column (Attribute ID) are considered true and from this set all the conditions that are found to be a match using the "Not Like Matching algorithm" are excluded.

The implementation of the "Not Like" Condition Indices can be exactly identical to that of the "Like" Condition Indices in one example of the invention. The matching algorithm described in more detail below explains the differences in how the two index trees are used in the "Like" and "Not Like" conditions.

Over the last few years most database vendors have incorporated text searching as part of the SQL in their database engines. The full text searching feature allows users of SQL to search for keywords in database columns rapidly. The database engines keyword extraction algorithms to extract keywords from specific columns and index these keywords. When an SQL query uses the CONTAINS operator the database engine references the index and returns all the rows that contain the keyword.

Condition C1 {CONTAINS (Skills, '.net')} of the example query Q1 uses the CONTAINS operator. This condition will be true for any row of the table that has the term '.net" in the "Skills" column. In the example Table 1 this condition will be true for rows 1 and 2. Usually in applications full text indexing and the CONTAINS operator are used on columns that are verbose in nature, like Job description, experience summary etc.

In one example of the invention, simple indices that map keywords to conditions are created for each keyword used in a CONTAINS condition. In one preferred implementation, two tables are used to create the "Contains' condition index. The "Contains" Condition Index is implemented using the "Contains Keyword Index" and the "Index Conditions" tables.

The "Contains Keyword Index" table consists of the following columns: (1) "Index ID" data type Numeric; (2) "Attribute ID" data type Numeric; and (3) "Keyword Value" data type Text. This table shall have a primary key of "Index ID". The Index ID is generated as a running sequence number every time a new unique combination of an Attribute and a Keyword value are added. This table is linked to the "Index Conditions" table using the column "Index ID".

Consider Condition C1 {CONTAINS (Skills, '.net')} of the example query Q1. This is a "Contains" condition. The first time the Value ".net" is used with the column "Skills" in a "Contains" condition, a row is added to the "Contains Value Index" table. In the example the Skills column has an attribute ID of 3. Thus a row is added in the "Contains Keyword Index" table with the following values

| Index ID | Attribute ID | Value |
|---|---|---|
| 101 | 3 | ".net" |

When a new row is added, keyword extraction is performed on the column skills and for each keyword in the "Contains Keyword Index" table is used to determine all the true conditions.

The "Not Contains" Condition Indices are implemented using the "Not Contains Keyword Index" table. The creation of the index can be identical to the creation of the Indices for the "Contains" conditions. The keywords used in the "Not Contains" Conditions are mapped to the "Index IDs" in the table.

The "Not Contains" Condition Index is implemented using the "Not Contains Keyword Index" and the "Index Conditions" tables. The "Not Contains Keyword Index" table consists of the following columns: (1) "Index ID" data type Numeric; (2) "Attribute ID" data type Numeric; and (3) "Keyword Value" data type Text. This table shall have a primary key of "Index ID". The Index ID is generated as a running sequence number every time a new unique combination of an Attribute and a Keyword value are added. This table is linked to the "Index Conditions" table using the column "Index ID".

The difference between the "Contains" and "Not Contains" condition implementation is primarily in the "Find Matching conditions" step and is discussed in more detail below.

Returning to FIG. 1, after a query is parsed, normalized into disjunctive normal form (step 1.2) and all the indices are created for each condition (step 1.2.1) then the Index Conditions Cross Reference table is populated with information about the condition and query (step 1.3). The reason for the existence of this index condition cross reference is to rapidly determine all the matching queries given a set of true conditions. This table is associated with all the index tables discussed above.

The disjunctive normal form of the query is used to populate the index conditions table. In the Create Condition Indexes step, corresponding to each unique condition an index record is created in one of the index tables and is identified uniquely by a value of "Index ID". In this step a mapping is created between the index ID corresponding to each condition in the query expression and every occurrence of the condition in the disjunctive normal form.

Consider the example query Q1 shown above. From this query the following conditions are identified:

C1=CONTAINS (Skills, '.net')
C2={Location in ('NY', 'NJ')}
C3={Job Type='E'}
C4={Work Status='FT'}

These conditions are indexed as discussed earlier and the following is the example mapping of conditions to indexes.

| Condition | Index Type | Index IDs |
|---|---|---|
| C1 = CONTAINS (Skills, '.net') | Contains Keyword Index | 101 |
| C2 = {Location in ('NY', 'NJ')} | Text Value Index | 3, 4 |
| C3 = {Job Type = 'E'} | Text Value Index | 1 |
| C4 = {Work Status = 'FT'}; | Text Value Index | 2 |

The algebraic disjunctive normal form of the query expression is $$Q1=(C1*C2*C3)+(C1*C2*C4).$$

This is further normalized by reducing each product as its own part:

$$Q1=P1+P2$$

$$P1=(C1*C2*C3);$$

$$P2=(C1*C2*C4)$$

In other words, Q1 is true when either P1 is true or P2 is true.

Once the query is reduced to its disjunctive normal form, a cross reference is created between the query, part and conditions, for example as follows.

| Query Number | Part Number | Condition Number | Number of Conditions in Part |
|---|---|---|---|
| 1 | 1 | 1 | 3 |
| 1 | 1 | 2 | 3 |
| 1 | 1 | 3 | 3 |
| 1 | 2 | 1 | 3 |
| 1 | 2 | 2 | 3 |
| 1 | 2 | 4 | 3 |

To this cross reference the Index ID is mapped and the Index Condition table rows are derived. In this example, Condition 1 is mapped to Index ID 101. Therefore, to every row that has the Condition 1, the Index ID 101 is mapped. To every row that contains Condition 2, both the "Index IDs" 3 and 4 are mapped. In this fashion, the following Index Conditions Table is derived as shown in Table 3 below.

TABLE 3

| Index ID | Query Number | Part Number | Condition Number | Number of Conditions in Part |
|---|---|---|---|---|
| 101 | 1 | 1 | 1 | 3 |
| 3 | 1 | 1 | 2 | 3 |
| 4 | 1 | 1 | 2 | 3 |
| 1 | 1 | 1 | 3 | 3 |
| 101 | 1 | 2 | 1 | 3 |
| 3 | 1 | 2 | 2 | 3 |
| 4 | 1 | 2 | 2 | 3 |
| 2 | 1 | 2 | 4 | 3 |

Once this step is completed, the processing of the query is complete. As mentioned above, this can complete processing after one of the triggering steps according to one example of the invention. It should be noted that the indices and tables created and updated as described above can be implemented in many ways. For example, they can be maintained in permanent or fixed storage, or they can be cached or kept as blobs, or implemented as arrays or collections in Java or C++. Those skilled in the art will appreciate the various possible alternative implementations.

Moreover, depending on the application, either from within the database or from an external database, the invention will be notified of a new or changed record. This event shall trigger the "Match record to queries" process flow shown in step 2.1 of FIG. 1. In one example, an interface for the calling application will provide the complete record, and an engine of the invention will return the identifiers of all the queries that match this record or it will return appropriate error messages if there is a failure in the matching process.

Continuing on, in step 2.2 all the conditions that are true for the given record are identified. This is accomplished utilizing the various condition index tables discussed in connection with step 1.2.1 above. Each column of the new record is matched against appropriate indexes associated with that column and all the "Index IDs' that match the given value for the column are retrieved. Using the "Attribute Condition XREF" table created in step 1.2, the condition types for each attribute is determined. This avoids table lookups that are likely to return no rows.

For example, consider the addition of the following record.

| Row Num ID-1 | Name ID-2 | Skills ID-3 | Location ID-4 | Education Level ID-5 | Career Level ID-6 | Work status ID-7 | Job Type ID-8 | Company Categories ID-9 |
|---|---|---|---|---|---|---|---|---|
| 11 | Johnny Smith | .net, SQL SERVER, MSACCESS | NY | M | XP | FT | E | IT |

Assuming only Query 1 has been added to the system at this point, the "Attribute Condition XREF" table looks as follows.

| Attribute ID | Condition Type |
|---|---|
| 3 | CONTAINS |
| 4 | IN |
| 8 | EQUALS |
| 7 | EQUALS |

This would indicate that attributes (i.e. columns) 3, 4, 8 and 7 will be used in the matching algorithm to retrieve the valid "Index IDs" for this record. The following sections describe an example method to retrieve different types of conditions using the condition indices.

The "Find Matching equals Conditions" process in step 2.2 is performed for every attribute in the "Attribute Condition XREF" table that has the Condition Type "Equals".

Given a value of a column the matching "Index IDs" for this value is determined by executing a simple query on one of the three 'Value Index tables' where the attribute ID equals that of the given column and Value is equal to the given value. If the column is of text data type the "Text Value Index" is used. "Numeric Value Index" and "Date Value Index" tables are used for Date and Number fields respectively.

For example, in the record for Johnny Smith (11), the "Job Type" column (Attribute ID=8) has a value of 'E'. To determine the "Index IDs' valid for this column and the equals condition the "Text Value Index" table is used. After the addition of the example Query Q1, the "Text Value Index" Table looks as follows.

| Index ID | Attribute ID | Value |
|---|---|---|
| 1 | 8 | "E" |
| 2 | 7 | "FT" |
| 3 | 4 | "NY" |
| 4 | 4 | "NJ" |

Accordingly, the following SQL statement, when executed, will retrieve the Index ID 1:
Select Index ID
From Text Value Index
Where Attribute ID=8 (parameter 1) and
Value="E" (parameter 2)

Similarly, corresponding to the work status column (Attribute ID=7) in the example which has a value of "FT", the same query is executed with the parameters 7 and "FT":
Select Index ID
From Text Value Index
Where Attribute ID=7 (parameter 1) and
Value="FT" (parameter 2)
This will yield the Index ID 2.

Similarly, for numeric attributes the query to retrieve all valid Index IDs corresponding to the "Equals" conditions for a given Column (Attribute ID=N) and Value (M) is
Select Index ID
From Numeric Value Index
Where Attribute ID=N (parameter 1) and
Value=M (parameter 2)

For Date/Time attributes the query to retrieve all valid Index IDs corresponding to the "Equals" conditions for a given Column (Attribute ID=N) and Value (DTTM) is
Select Index ID
From Date Value Index
Where Attribute ID=N (parameter 1) and
Value=DTTM (parameter 2)

The Find Matching "Not Equals" Conditions process is performed for every attribute in the "Attribute Condition XREF" table that has the Condition Type "Not Equals".

Given a value of a text column the matching "Index IDs" for this value is determined by retrieving all the "Index IDs" for the given column from the "Not Text Value Index" table where the attribute ID equals the attribute ID of the given column. From this list all the "Index IDs" that match the given value are removed. The resulting list represents the Index IDs corresponding to all of the "Not equals conditions" that match the given value for the column. If the column is of text data type the "Not Text Value Index" is used. "Not Numeric Value Index" and "Not Date Value Index" tables are used for Date and Number fields respectively.

For example, consider the "Not Text Value Index" table below.

| Index ID | Attribute ID | Value |
|---|---|---|
| 5 | 6 | "XP" |
| 6 | 6 | "M" |
| 7 | 6 | "E" |
| 8 | 6 | "S" |
| 9 | 6 | "EX" |

In the example record for Johnny Smith (row 11) above, the "Career Level" Column (attribute ID=6) has a value of "XP". Assuming the "Attribute Condition XREF" table has a row with Attribute ID=6 and Condition type='NOT EQUALS', the Find matching "Not Equals" Conditions step is performed as follows.

The following SQL statement, when executed, will retrieve the Index IDs {5, 6, 7, 8 and 9}:
Select Index ID
From Not Text Value Index
Where Attribute ID=6 (parameter 1)
Now the SQL statement below is executed to retrieve the Index Id 5:
Select Index ID
From Not Text Value Index
Where Attribute ID=6 (parameter 1)
And Value="XP" (parameter 2)
This Index ID 5 is now removed from the initial set {5, 6, 7, 8 and 9} to get the matching Index IDs of {6, 7, 8 and 9} corresponding to the not equals condition for the "Career Level" Column (attribute ID=6) that has a value of "XP".

Alternatively, the following SQL which yields the same result may also be used to find the matching Index IDs of {6, 7, 8 and 9} corresponding to the not equals condition for the "Career Level" Column (attribute ID=6) that has a value of "XP".
Select Index ID
From Not Text Value Index
Where Attribute ID=6 (parameter 1)
And Value!="XP" (parameter 2)

For Columns with Numeric and Date Data type the step can be exactly identical except 'Not Numeric Value Index' and 'Not Date Value Index' will be used respectively.

The Find Matching 'In' Conditions process is performed for every attribute in the "Attribute Condition XREF" table that has the Condition Type "In". The step can be identical to the Find Matching 'Equals' Conditions step.

Given a value of a column the matching "Index IDs" for this value is determined by executing a simple query on one of the three 'Value Index tables' where the attribute ID equals that of the given column and Value is equal to the given value. If the column is of text data type the "Text Value Index" is used. "Numeric Value Index" and "Date Value Index" tables are used for Date and Number fields respectively.

For example, in the example record for Johnny Smith (11) above, the "Location" column (Attribute ID=4) has a value of 'NY'. To determine the "Index IDs' valid for this column and the "In" condition the "Text Value Index" table is used. After the addition of the example Query Q1, the "Text Value Index Table looks as follows.

| Index ID | Attribute ID | Value |
|---|---|---|
| 1 | 8 | "E" |
| 2 | 7 | "FT" |
| 3 | 4 | "NY" |
| 4 | 4 | "NJ" |

The following SQL statement, when executed, will retrieve the Index ID 3.
Select Index ID
From Text Value Index
Where Attribute ID=4 (parameter 1) and
Value="NY" (parameter 2)

Similarly, for numeric attributes the query to retrieve all valid Index IDs corresponding to "In" conditions for a given Column (Attribute ID=N) and Value (M) is
Select Index ID
From Numeric Value Index
Where Attribute ID=N (parameter 1) and
Value=M (parameter 2)

For Date/Date Time attributes the query to retrieve all valid Index IDs corresponding to the "In" conditions for a given Column (Attribute ID=N) and Value (DTTM) is
Select Index ID
From Date Value Index
Where Attribute ID=N (parameter 1) and
Value=DTTM (parameter 2)

The Find Matching "Not In" Conditions process is performed for every attribute in the "Attribute Condition XREF" table that has the Condition Type "Not In".

Given a value for a specific column all the "Index IDs" corresponding to this column are retrieved from the "Not In XREF" table. From this set of "Index IDs" any Index ID that is mapped to the "Value Index" corresponding to the given value is removed. If the column is of text data type the "Not Text Value Index" is used. "Not Numeric Value Index" and "Not Date Value Index" tables are used for Date and Number fields respectively.

For example, consider the "Not In XREF" table in the following state:

| Index ID | Attribute ID | Value Index ID |
|---|---|---|
| 12 | 6 | 6 |
| 12 | 6 | 7 |

In the example record above (11), the "Career Level" Column (attribute ID=6) has a value of "XP". Assuming the "Attribute Condition XREF" table has a row with Attribute ID=6 and Condition type='NOT IN', the Find matching "Not In" Conditions step is performed as follows.

The following SQL statement will retrieve set 1 as {12}
Select Distinct Index ID
From Not In XREF
Where Attribute ID=6(parameter 1)
A second SQL statement is executed to retrieve the blank set of Index IDs { } as Set2:
Select Distinct Index ID
From Not In XREF
Where Attribute ID=6(parameter 1)
And Value Index ID in
{Select Index ID
From Not Text Value Index
Where Attribute ID=6(parameter 1)
And Value="XP" (parameter 2)
Set1-Set2={12} is the set of all true "Not In" Conditions for the given value ("XP") of the "Career Level" column.

For Columns with Numeric and Date Data type the step is exactly identical except 'Not Numeric Value Index' and 'Not Date Value Index' will be used respectively in lieu of the "Not Value Index" table.

The Find Matching 'Range' Conditions process is performed for every attribute in the "Attribute Condition XREF" table that has the Condition Type "Range".

Given a Numeric column and its value, all the Index IDs corresponding to this value are retrieved from the Numeric Range Index Table and Higher Order Numeric Range Index Table corresponding to this column, where the given value falls within the interval of the row. If the column is of Date data type then the Date Range Index and Higher Order Date Range Index Tables are used.

For example, consider the "Numeric Range Index" table as described in the example above:

| Index ID | Attribute ID | Lower Limit | Upper Limit |
|---|---|---|---|
| 21 | 10 | 200001 | 250000 |
| 22 | 10 | 250001 | 300000 |
| 23 | 10 | 300001 | 350000 |
| 24 | 10 | 500001 | 600000 |
| 25 | 10 | 350001 | 400000 |
| 26 | 10 | 400001 | 500000 |

Assuming a real estate record is added with the value of the "Home Price" column (attribute ID=10) equaling $275000, the index ID corresponding to this is retrieved by executing the following SQL:
Select Index ID
From Numeric Range Index
Where Attribute ID=10 (parm1) and
Lower Limit<=275000 (parm2) and
Upper Limit>=275000 (parm2)
In this example the Index ID 22 is returned.

This same SQL statement is executed on higher order numeric range index tables also to obtain all the Index IDs corresponding to the given value of the specified column.

The Find Matching 'Like' Conditions process is performed for every attribute in the "Attribute Condition XREF" table that has the Condition Type "Like". As set forth above, the "Like" conditions are divided into 3 types: (1) "Like—Begins with"; (2) "Like—Ends with"; and (3) "Like—Part of".

Given a value for a text column the "Index Ids" corresponding to the "Like" condition are retrieved using the "Node" and "Node Branches" tables. The step to retrieve the "Index Ids' for the three types of Like conditions are illustrated below.

The Find Matching "Like—Begins with" Conditions process is performed for every attribute in the "Attribute Condition XREF" table that has the Condition Type "Like—Begins with". For a Given value of the column, the "Node" and "Node Branches" tables are used to identify all the "Index IDs" associated with the "Like—Begins with" conditions involving the given value of the column. This is achieved by traversing the "Like—Begins with" tree associated with the given column.

Figure 5:
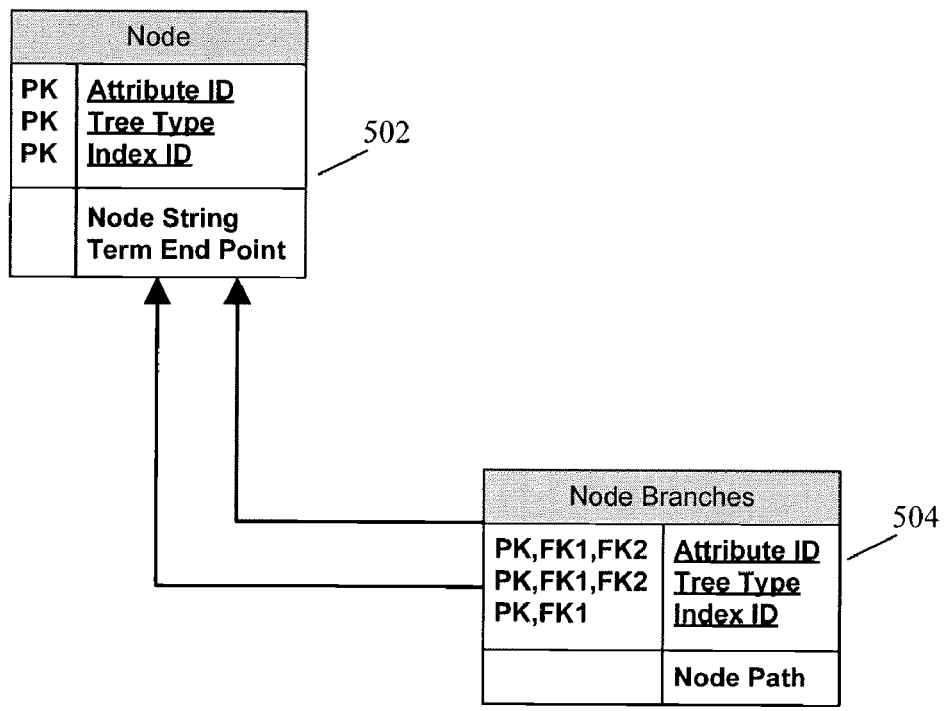
FIG. 5 illustrates how node and node branch tables are implemented in accordance with an embodiment of the invention.

An example of what is involved in using these two tables is illustrated in FIG. 5. As shown in FIG. 5, the node table 502 includes entries for each Index ID, including an associated attribute ID (i.e. column) and tree type (e.g. "Begins With"). Each entry in the node table 502 also includes a node string and term end point indicator, as described above. As further shown in FIG. 5 and described above, the node branches table 504 can include several entries linked to one or more parent entries in the node table, including an associated attribute ID (i.e. column) and tree type (e.g. "Begins With"), which should be the same as the parent entry in node table 502. Each entry also includes a node path as described above.

Figure 6:
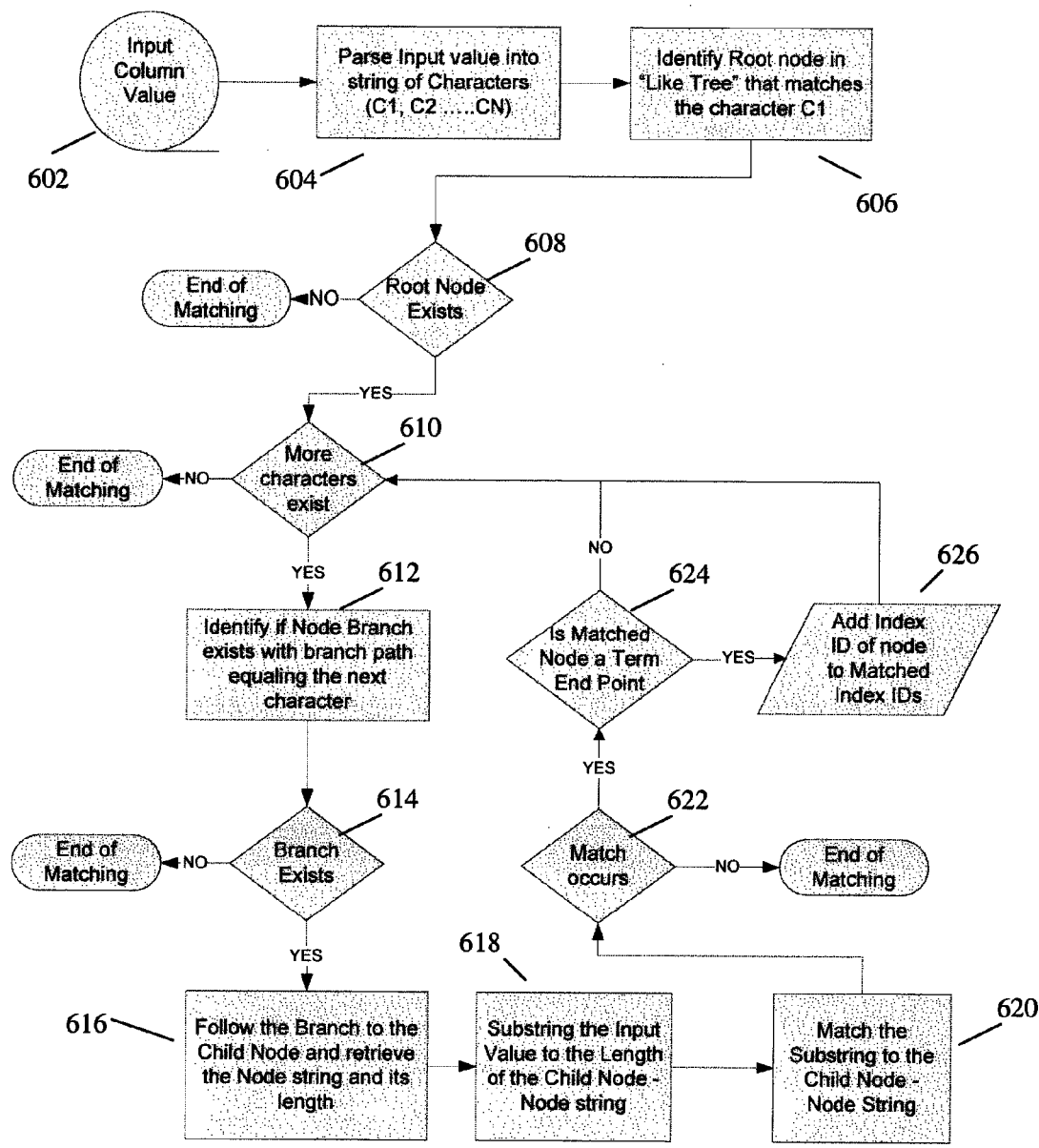
FIG. 6 is a flowchart illustrating a process of matching an input string to a like condition index table in accordance with an embodiment of the invention.

The flow chart shown in FIG. 6 illustrates one example algorithm according to the invention that can be used to retrieve matching "Like—Begins with" conditions. By traversing the "Like—Begins with" Tree for the given value of the column as discussed in this flow chart all the "Index IDs" are retrieved.

The steps shown in FIG. 6 will be described in more detail with reference to the following example. Consider the Conditions added in the example described above and the state of the Node and Node Branches Tables after adding these conditions.

C30={Name Like 'John%'}
C31={Name Like 'Jack%'}
C32={Name Like 'Joan%'}
C33={Name Like 'Johnson%'}

The Node Table after adding these conditions looks like:

| Index ID | Node String | Term End Point |
|---|---|---|
| 1001 | J | N |
| 1002 | JOHN | Y |
| 1003 | JACK | Y |
| 1004 | JO | N |
| 1005 | JOAN | Y |
| 1006 | JOHNSON | Y |

The Node Branches Table looks like:

| Parent Index ID | Branch Path | Child Index ID |
|---|---|---|
| 1001 | O | 1004 |
| 1001 | A | 1003 |
| 1004 | H | 1002 |
| 1004 | A | 1005 |
| 1002 | S | 1006 |

Consider now the new record in example above:

| Row Num ID-1 | Name ID-2 | Skills ID-3 | Location ID-4 | Education Level ID-5 | Career Level ID-6 | Work status ID-7 | Job Type ID-8 | Company Categories ID-9 |
|---|---|---|---|---|---|---|---|---|
| 11 | Johnny Smith | .net, SQL SERVER, MSACCESS | NY | M | XP | FT | E | IT |

The Column 2 for Name has a value of Johnny Smith. With reference to FIG. 6, the following steps are involved in traversing the "Like Begins with" tree shown in the example of FIG. 4E and identifying the "Index IDs". First, the Input Value is "Johnny Smith" received in step 602. Next, the input Value is parsed into a string of characters in step 604:

| Character Position | Value |
|---|---|
| 1 | 'J' |
| 2 | 'o' |
| 3 | 'h' |
| 4 | 'n' |
| 5 | 'n' |
| 6 | 'y' |
| 7 | ' ' |
| 8 | 'S' |
| 9 | 'm' |
| 10 | 'i' |
| 11 | 't' |
| 12 | 'h' |

Next, in step 606 the Root Node for this Value is determined ('J'). If the root Node exists (checked in step 608), processing continues, otherwise matching ends. In step 610, it is determined whether there are more characters in the input string. If so, processing continues in step 612 by determining the next character in the input string, and identifying a node branch with a branch path for the next character. In this example, the next character is 'o', and there is a node branch for the root node with Branch path that equals 'o'. Accordingly, a branch exists as checked in step 614 and processing continues to step 616. In this step, the child node for this branch is found and its length determined. In this example, the String in this child node is 'John' and its length is 4. Next in step 618, a substring of the Input Value having the same length as the child node string is determined. In this example, a substring of the input value for a length of 4 yields 'John'. Next, in step 620, the input value substring is compared to the child node string, and in step 622, it is determined whether there is a match. In this example, the Substring Matches the Node String of the child Node. Accordingly, a next step 624 determines whether the matching child node is a term end point. In this example, the answer is yes, the Child Node is a term End Point. Accordingly, in a next step 624, the Index ID 1002 is added to the matched Index IDs, and processing returns to step 610. At this point, more characters exist in the Input String after 'John'. However, there is no Node Branch to the Node 'JOHN' with a node path equaling 'n' which is the next character in the input string as determined in step 612. Accordingly, Matching ends and the result of the matching algorithm points Index ID 1002.

The Find Matching "Like—Ends with" conditions process is performed for every attribute "Attribute Condition XREF" table that has the Condition Type "Like—Ends with". For a Given value of the column, the "Node" and "Node Branches"

table are used to identify all the "Index IDs" associated with the "Like—Ends with" conditions involving the given value of the column. The characters in the value are reversed and the reversed string is used to transverse the "Like—Ends with" Tree. Once the character string of the column value is reversed the matching algorithm is exactly identical to the "Like—Begins with" matching algorithm.

For example, consider an Input Value of "Johnny Smith" for the column "Name" that needs to be matched using the "Like—Ends with" tree. The first step is to reverse the input value to "thimS ynnhoJ'. This reversed string is then matched in a manner identical to the algorithm described in the Find Matching "Like—Begins with" conditions section.

The Find Matching "Like—Part of" conditions process is performed for every attribute in the "Attribute Condition XREF" table that has the Condition Type "Like—Part of". For a Given value of the column, the "Node" and "Node Branches" table are used to identify all the "Index IDs" associated with the "Like—Part of" conditions involving the given value of the column. The exact same algorithm as described in the Matching "Like—Begins with" conditions section is used to identify the matching "Index IDs" except that the algorithm is invoked recursively once each for the entire string, the entire string with the first two characters removed and so on until just the last character of the input value id matched using this method.

For example, consider an Input Value of "Johnny Smith" for the column "Name" that needs to be matched using the "Like—Part of" tree. To achieve this, the algorithm described in the Find Matching "Like—Begins with" conditions section is invoked recursively for each of the following strings: 'Johnny Smith'; 'ohnny Smith'; 'hnny Smith'; 'nny Smith'; 'ny Smith'; 'y Smith'; 'Smith'; 'Smith'; 'mith'; 'ith'; 'th'; and 'h'.

The Find Matching "Not Like" Conditions process is performed for every attribute in the "Attribute Condition XREF" table that has the Condition Type "Not Like". Similar to the "Like" Conditions, "Not Like" conditions are also divided into three types: (1) The "Not Like—Begins with"; (2) The "Not Like—Ends with" and (3) The "Not Like—Part of".

Given a value for a text column the "Index Ids" corresponding to the "Not Like" condition are retrieved using the "Node" and "Node Branches" tables. In principle all the "Not-Like Conditions" are considered true except those that match the given value using the algorithm described in the Find Matching "Like" Conditions section. For a given column all the "Index Ids" corresponding to the "Not Like" conditions and that attribute ID are retrieved. Subsequently from this set all the "Index IDs" determined by traversing the three "Not Like" trees using the column value as described in the previous section are removed.

The Find Matching "Contains" Conditions process is performed for every attribute in the "Attribute Condition XREF" table that has the Condition Type "Contains". Given a value of a column keyword extraction is performed on the text of the column. Once keywords are extracted executing a simple query on "Contains keyword Index" tables where the attribute ID equals that of the given column and Value is equal to the each of the extracted keywords returns all the "Index IDs" that are valid for the given value of the column.

For example, in the example record above (11), the "Skills" column (Attribute ID=3) has a value of ',net, SQL SERVER, MSACCESS'. Performing Keyword extraction on this value will return the keywords ".net", "SQL SERVER" and "MSACCESS".

To determine the "Index IDs' valid for this column and the "Contains" condition the "Contains Keyword Index" table is used. After the addition of the example Query Q1, the "Contains Keyword Index" table looks as follows.

| Index ID | Attribute ID | Value |
| --- | --- | --- |
| 101 | 3 | ".net" |

The following SQL statement will thus retrieve the Index ID 101:

Select Index ID

From Contains Keyword Index

Where Attribute ID=3 and

Value in (".net", "SQL SERVER", "MSACCESS")

The Find Matching "Not Contains" Conditions process is performed for every attribute in the "Attribute Condition XREF" table that has the Condition Type "Not Contains". For the given column all the "Index IDs" corresponding to all the "Not Contains conditions" involving the given column's attribute ID are considered true except the Index IDs that are matched using the steps discussed in the Match "Contains" Condition algorithm.

Given a column all the "Index IDs" having the "Attribute ID" equaling the "Attribute ID" of the column are retrieved from the "NOT Contains Keyword Index" table as SET 1.

For the given column keyword extraction is performed on the text of the column. Once keywords are extracted executing a simple query on "NOT Contains keyword Index" tables where the attribute ID equals that of the given column and Value is equal to the each of the extracted keywords yields all the matching "Index IDs" as SET 2.

SET1-SET2 yields all the valid "Not Contains" "Index IDs" for the given value of the column.

At this point in processing a new record that is added, all the "Index IDs" associated to all the true conditions are determined. These "Index IDs" are now used to Find all the Matching queries corresponding to the newly added record.

Returning to FIG. 1, after all matching conditions are found in Step 2.2, the process flow continues with Find Matching Queries in step 2.3. Accordingly, once all the "Index IDs" correspond to conditions that are true for the given record are identified, the Matching Queries are determined by executing the following SQL on the Index Conditions Table:

Select Query Number

Where Index ID in (Matched Index IDs)

Group by Query Number, Part Number

Having count(*)=Condition Count

For example, consider the Index Conditions table in the following state from the above example Table 3:

| Index ID | Query Number | Part Number | Condition Number | Condition Count |
| --- | --- | --- | --- | --- |
| 101 | 1 | 1 | 1 | 3 |
| 3 | 1 | 1 | 2 | 3 |
| 4 | 1 | 1 | 2 | 3 |
| 1 | 1 | 1 | 3 | 3 |
| 101 | 1 | 2 | 1 | 3 |
| 3 | 1 | 2 | 2 | 3 |
| 4 | 1 | 2 | 2 | 3 |
| 2 | 1 | 2 | 4 | 3 |

Likewise, consider the following example record:

| Row Num ID-1 | Name ID-2 | Skills ID-3 | Location ID-4 | Education Level ID-5 | Career Level ID-6 | Work status ID-7 | Job Type ID-8 | Company Categories ID-9 |
|---|---|---|---|---|---|---|---|---|
| 11 | Johnny Smith | .net, SQL SERVER, MSACCESS | NY | M | | XP | FT | E | IT |

As discussed above, after searching the condition indices with the various attributes in this record, the "Index IDs" 1, 2, 3 and 101 are returned.

Accordingly, executing the following SQL will return the query number 1:

Select distinct Query Number
Where Index ID in (1, 2, 3, 101)
Group by Query Number, Part Number
Having count(*)=Condition Count According to the needs of the application, the query number 1 can then be automatically executed on the database, and/or a user associated with the query can be notified that query result information has been changed or added, and/or presented with the new or changed record.

In one possible example, the invention is implemented as a Relational Database Management System(RDBMS) add-on product. Accordingly, the "Save Query" process flows and/or the "Match Record to Saved Query Process Flows" are implemented as software programs or processors executing on a database server. For example, such software can be built using java technology for platform independence, and can be used in conjunction with any Commercial RDBMS product like ORACLE, MS SQLServer, DB2 etc. Those skilled in the art will appreciate and understand how to achieve such various and other implementations after being taught by the descriptions herein.

Figure 7:
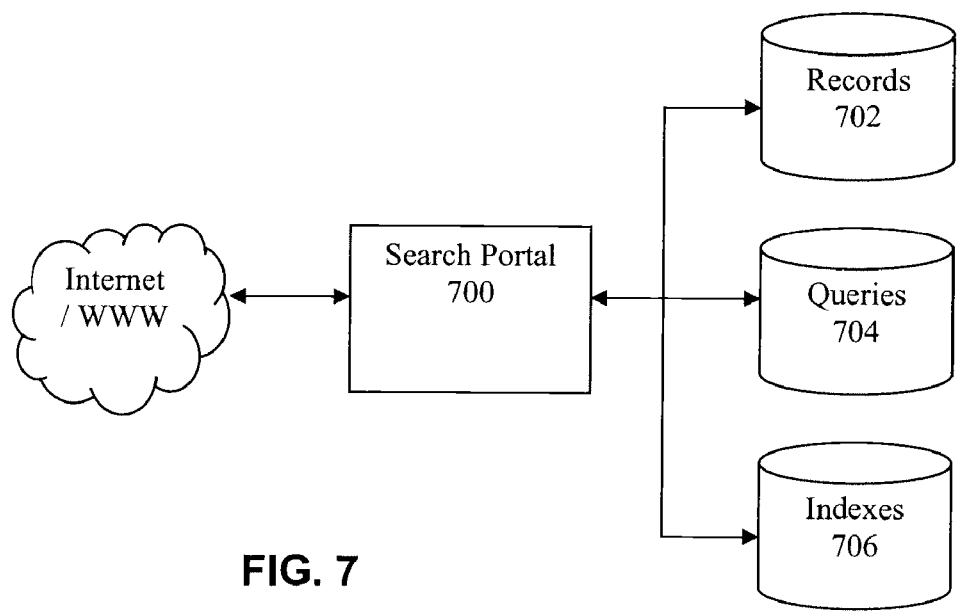
FIG. 7 is a functional block diagram illustrating one possible implementation of the invention in a search portal.

FIG. 7 illustrates one possible use of the invention in an online classified portal 700 (e.g. Job, Real Estate, Automobile search portal, etc.) which conventionally provide the ability for customers to perform online searches on a database of records 702 via a network such as the Internet and World Wide Web using conventional search engines, query tools and interfaces and associated web pages well known to those skilled in the art. While these searches produce results that are typically snapshots in time, the underlying database 702 is continuously updated with new records (listings of new jobs, homes, cars, job seekers, etc).

According to aspects of the invention, rather than requiring users to re-execute the search periodically to retrieve new listings that match their criteria, the invention allows online portal 700 to create search agents which are executed automatically on a periodic basis (Nightly, weekly etc) to determine new matches since the first time the search query was created. As another example, online portal 700 may execute the search agents each time a record in the database 702 is updated or added, or after a certain threshold number of records are updated or added. It should be apparent that, in addition to saving the customers' queries, the online portal 700 also can have functionality for creating and maintaining user accounts, and/or other mechanisms for identifying customers and associating them with the saved queries. Customer information maintained by portal 700 can also include email addresses, and other profiles or information that allow a user to specify a preference and/or means of being notified of changed search results. Those skilled in the art will appreciate the various known methods and alternatives that can be used to implement such mechanisms and/or functionality.

As shown in FIG. 7, portal 700 adapted with the functionality of the invention allows matching and retrieval of all saved searches/queries 704 every time a new record (Job, Home, Car) is added to the database 702. As described above, after a customer saves their search criteria, the query is saved in list 704 and condition indexes and cross-reference tables are created and stored in indexes 706.

Thereafter, when new/changed records are stored in database 702 (for example, using the automated search agents as mentioned above, or manually via an administrator interface, or by other users via a web interface provided by portal 700 via the Internet or WWW), portal 700 uses the matching algorithms further described above to determine which saved queries in list 704 are affected. The portal can then either notify the user associated with the saved query and/or push the new results to the associated user via any one of a plurality of known signaling methods or mechanisms (e.g. sending a message via email or RSS feed, dynamically updating a screen via Ajax, etc.).

By providing instantaneous and incremental matching of new records to saved searches, the invention enhances the user experience of search portals such as 700 and also provides a competitive advantage to customers in time-sensitive domains like, jobs, real estate, automobiles etc.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer-implemented method comprising:
receiving a query for identifying a set of data among a plurality of sets of data, wherein the query is an expression comprising one or more component conditions, wherein the data has a plurality of attributes;
parsing the query into its component conditions;
creating entries in a plurality of condition indices for each of the component conditions parsed from the query, wherein the plurality of condition indices correspond to a respective plurality of condition types, the entries being created based on the condition type of each of the component conditions;
creating a cross-reference between the query and the parsed component conditions that have to be true in order for the query to be true;
comparing a new or changed set of data to the stored condition indices and identifying conditions that are true based on values of the attributes in the new or changed set of data and identifying the query using the cross-reference if the necessary conditions are true for the new or changed set of data, wherein one or more of the receiving, parsing, creating and comparing steps are implemented by the computer.

2. The method of claim 1, further comprising:
returning updated search results for the identified associated query if there is a match.

3. The method of claim 1, wherein each set of the plurality of sets of data is part of a stream of data, each set having one or more fields, and the query is a Boolean rule to be applied to certain of the fields.

4. The method of claim 1, wherein the parsing step includes:
identifying the component conditions in the query;
generating an expression in disjunctive normal form with the identified component conditions; and
identifying the plurality of condition indices based on the generated expression.

5. The method of claim 4, wherein the identified set of data is a database record, and wherein the plurality of sets of data comprise a table, and wherein the query is an SQL query and the component conditions are identified from a where clause in the SQL query.

6. The method of claim 5, wherein the table comprises the plurality of attributes associated with each record, the step of creating the cross-reference including:
maintaining a master table that maps certain of the attributes to a plurality of types of the conditions; and
updating the master table based on the identified component conditions.

7. The method according to claim 6, wherein the comparing step includes:
determining whether the new or changed record contains any of the certain attributes in the updated master table; and
limiting a determination of whether there is a match based on the determination of the new or changed record contains any of the certain attributes.

8. The method of claim 4, wherein the step of creating a cross-reference includes:
maintaining an index conditions cross reference table that associates the query with each of the identified plurality of conditions; and
updating the index conditions cross reference table based on results of the parsing step.

9. The method according to claim 8, wherein the comparing step includes:
querying the updated index conditions cross reference table using the identified plurality of condition indices.

10. The method of claim 1, wherein the sets of data include text attributes, and wherein if the query includes a text string, the parsing step includes:
updating a node table based on the text string; and
updating a node branch table based on branch paths within the text string.

11. The method of claim 10, further comprising:
maintaining a plurality of the node table and the node branch table respectively associated with each of a plurality of text conditions,
wherein the text conditions include at least Begins With, Contains and Part of.

12. The method of claim 1, wherein the sets of data include numeric or date attributes, and wherein if the query includes a numeric or date value and uses a range operator, the parsing step includes:

updating a range condition table which identifies all true conditions for a given value of a numeric or date attribute in the sets of data.

13. The method of claim 1, wherein if the query includes a NOT or NOT IN operator, the parsing step includes:
updating a NOT condition index that returns all true NOT or NOT IN conditions for a given value of an attribute in the sets of data.

14. A method comprising:
providing one or more computers that are adapted with a query tool and a database of records accessible via an online portal, wherein the records have a plurality of attributes;
receiving a query from a user via the online portal, wherein the query is an expression comprising one or more conditions;
using the query tool to perform a search of the database, and returning search results to the user;
parsing the query to extract its conditions;
creating entries in a plurality of condition indices for each of the conditions parsed from the query, wherein the plurality of condition indices correspond to a respective plurality of condition types, the entries being created based on the condition type of each of the extracted conditions;
creating a cross-reference between the query and the parsed conditions that have to be true in order for the query to be true;
receiving a new or changed record for storing in the database;
comparing the received record against the stored condition indices to determine conditions that are true based on values of the attributes in the new or changed set of data;
identifying the query using the cross-reference if the necessary conditions are true for the received record; and
notifying the user if it is determined that the search results for the query are changed.

15. The method of claim 14, wherein the notifying step includes providing the user with the changed search results.

16. The method of claim 14, wherein the notifying step includes one or more of sending an email to the user, signaling the user via an online feed, and updating a search results screen.

17. An apparatus for searching for records in a table, wherein the records have a plurality of attributes, comprising:
a computer-implemented query processor that is adapted to parse a received query, wherein the query is an expression comprising one or more conditions and the parsing extracts the conditions, create entries in a plurality of condition indices for each of the extracted conditions parsed from the query, wherein the plurality of condition indices correspond to a respective plurality of condition types, the entries being created based on the condition type of each of the component conditions, and create a cross-reference between the query and the parsed component conditions that have to be true in order for the query to be true; and
a computer-implemented query matching processor that is adapted to compare a new or changed record to the stored condition indices and to identify conditions that are true based on values of the attributes in the new or changed set of data, and to further identify the query if the necessary conditions are true for the new or changed set of data.

18. The apparatus of claim 17, wherein the table comprises a relational database, and wherein query is an SQL query and the individual conditions are identified by the query processor from a where clause in the SQL query.

19. The apparatus of claim 17, further comprising:
an online portal adapted to receive the query from a user via a network and to return search results to the user via the network.

20. The apparatus of claim 19, wherein the online portal is further adapted to notify the user if the query match processor determines that there is a match for the new or changed record.

* * * * *